US009807740B2

(12) United States Patent
Oizumi et al.

(10) Patent No.: US 9,807,740 B2
(45) Date of Patent: Oct. 31, 2017

(54) TERMINAL DEVICE, BASE STATION DEVICE, AND UPLINK RESPONSE SIGNAL TRANSMISSION METHOD

(71) Applicant: Sun Patent Trust, New York, NY (US)

(72) Inventors: Toru Oizumi, Kanagawa (JP); Ayako Horiuchi, Kanagawa (JP); Kazuki Takeda, Kanagawa (JP); Akihiko Nishio, Osaka (JP)

(73) Assignee: Sun Patent Trust, New York, NY (US)

( * ) Notice: Subject to any disclaimer, the term of this patent is extended or adjusted under 35 U.S.C. 154(b) by 133 days.

(21) Appl. No.: 14/414,077

(22) PCT Filed: Jul. 18, 2013

(86) PCT No.: PCT/JP2013/004403
§ 371 (c)(1),
(2) Date: Jan. 9, 2015

(87) PCT Pub. No.: WO2014/020851
PCT Pub. Date: Feb. 6, 2014

(65) Prior Publication Data
US 2015/0173063 A1    Jun. 18, 2015

(30) Foreign Application Priority Data

Aug. 2, 2012  (JP) ................................ 2012-172348
Sep. 24, 2012  (JP) ................................ 2012-209810

(51) Int. Cl.
*H04W 72/04*    (2009.01)
*H04W 72/00*    (2009.01)
(Continued)

(52) U.S. Cl.
CPC ....... *H04W 72/0413* (2013.01); *H04L 1/1678* (2013.01); *H04L 1/1861* (2013.01);
(Continued)

(58) Field of Classification Search
None
See application file for complete search history.

(56) References Cited

U.S. PATENT DOCUMENTS

| 2010/0232382 | A1* | 9/2010 | Gauvreau | ............. | H04W 72/02 370/329 |
| 2012/0250641 | A1* | 10/2012 | Sartori | ................ | H04W 72/042 370/329 |

(Continued)

FOREIGN PATENT DOCUMENTS

| JP | 2011-507704 A | 3/2011 |
| WO | 2008/115004 A2 | 9/2008 |

(Continued)

OTHER PUBLICATIONS

Extended European Search Report dated Jul. 29, 2015, for corresponding EP Application No. 13825495.8-1851/2882222, 8 pages.

(Continued)

*Primary Examiner* — Brandon Renner
*Assistant Examiner* — Jay Vogel
(74) *Attorney, Agent, or Firm* — Seed IP Law Group LLP

(57) ABSTRACT

When downlink data allocation is indicated in an ePDCCH, this terminal device can determine PUCCH resources to be used in notification of response signals indicating results of error detection of downlink data without imposing scheduling restrictions on future DL subframes. In this device, an extraction unit (204) receives downlink data on multiple unit bands. A CRC unit (211) detects errors in the downlink data. A response signal generation unit (212) generates a response signal by using the results of error detection of the downlink data obtained by the CRC unit (211). The control unit (208) arranges the response signal in the PUCCH resources corresponding to the current DL subframe.

15 Claims, 30 Drawing Sheets

(51) Int. Cl.
*H04L 1/16* (2006.01)
*H04L 1/18* (2006.01)
*H04W 88/02* (2009.01)
*H04W 88/08* (2009.01)

(52) U.S. Cl.
CPC ....... *H04W 72/00* (2013.01); *H04W 72/0446* (2013.01); *H04W 72/042* (2013.01); *H04W 88/02* (2013.01); *H04W 88/08* (2013.01)

(56) References Cited

U.S. PATENT DOCUMENTS

| | | | | |
|---|---|---|---|---|
| 2012/0300752 A1* | 11/2012 | Kwon | ............... | H04W 56/0005 370/336 |
| 2012/0320846 A1* | 12/2012 | Papasakellariou | .. | H04W 72/042 370/329 |
| 2013/0230017 A1* | 9/2013 | Papasakellariou | ......................... | H04W 72/0406 370/330 |
| 2013/0322352 A1* | 12/2013 | Han | .................... | H04W 72/042 370/329 |
| 2014/0003375 A1* | 1/2014 | Nam | ................. | H04W 72/0406 370/329 |

FOREIGN PATENT DOCUMENTS

| | | |
|---|---|---|
| WO | 2009/156838 A1 | 12/2009 |
| WO | 2010/082877 A1 | 7/2010 |

OTHER PUBLICATIONS

3GPP TS 36.211 V10.1.0, "3rd Generation Partnership Project; Technical Specification Group Radio Access Network; Evolved Universal Terrestrial Radio Access (E-UTRA); Physical Channels and Modulation (Release 10)," Mar. 2011, 103 pages.
3GPP TS 36.212 V10.1.0, "3rd Generation Partnership Project; Technical Specification Group Radio Access Network; Evolved Universal Terrestrial Radio Access (E-UTRA); Multiplexing and channel coding (Release 10)," Mar. 2011, 76 pages.
3GPP TS 36.213 V10.1.0, "3rd Generation Partnership Project; Technical Specification Group Radio Access Network; Evolved Universal Terrestrial Radio Access (E-UTRA); Physical layer procedures (Release 10)," Mar. 2011, 115 pages.
Ericsson, ST-Ericsson, "PUCCH resource allocation for ePDCCH," R1-124156, 3GPP TSG-RAN WG1 Meeting #70bis, Agenda Item: 7.5.7, San Diego, USA, Oct. 8-12, 2012, 4 pages.
International Search Report dated Oct. 8, 2013, for corresponding International Application No. PCT/JP2013/004403, 4 pages.
Nakao et al., "Performance enhancement of E-UTRA uplink control channel in fast fading environments," IEEE 69th Vehicular Technology Conference, VTC Spring 2009, 5 pages.
Panasonic, "Discussion on PUCCH resource allocation for EPDCCH for TDD," R1-124788, 3GPP TSG-RAN WG1 Meeting #71, Agenda Item: 6.2.3.5, New Orleans, USA, Nov. 12-16, 2012, 6 pages.
Panasonic, "EPDCCH-PUCCH resource allocation for TDD," R1-124244, 3GPP TSG-RAN WG1 Meeting #70bis, Agenda Item: 7.5.7, San Diego, US, Oct. 8-12, 2012, 4 pages.
Pantech, "PUCCH resource allocation in response to E-PDCCH," R1-122456, 3GPP TSG RAN1 #69, Agenda Item: 7.6.5, Prague, Czech Republic, May 21-25, 2012, 3 pages.
Samsung, "HARQ-ACK PUCCH Resources in Response to E-PDCCH Detections," R1-121647, 3GPP TSG RAN WG1 #68bis, Agenda Item: 7.6.4, Jeju, Korea, Mar. 26-30, 2012, 2 pages.
Sharp, NSN, Nokia, Pantech, Samsung, "WF on PUCCH Format 1a/1b resource allocation for ePDCCH based HARQ-ACKs," R1-123013, TSG-RAN WG1 Meeting #69, Agenda Item: 7.6.5, Prague, Czech, May 21-25, 2012, 4 pages.
Samsung, "HARQ-ACK PUCCH Resources in Response to ePDCCH Detections," R1-122259, 3GPP TSG RAN WG1 #69, Agenda Item: 7.6.5, Prague, Czech Republic, May 21-25, 2012, 2 pages.

* cited by examiner

TERMINAL DEVICE, BASE STATION DEVICE, AND UPLINK RESPONSE SIGNAL TRANSMISSION METHOD

TECHNICAL FIELD

The present invention relates to a terminal apparatus, a base station apparatus and a transmission method.

BACKGROUND ART

3GPP LTE employs Orthogonal Frequency Division Multiple Access (OFDMA) as a downlink communication scheme. In radio communication systems to which 3GPP LTE is applied, base stations transmit synchronization signals (i.e., Synchronization Channel: SCH) and broadcast signals (i.e., Broadcast Channel: BCH) using predetermined communication resources. Meanwhile, each terminal finds an SCH first and thereby ensures synchronization with the base station. Subsequently, the terminal reads BCH information to acquire base station-specific parameters (e.g., frequency bandwidth) (see, Non-Patent Literature (hereinafter, abbreviated as NPL) 1, 2 and 3).

In addition, upon completion of the acquisition of the base station-specific parameters, each terminal sends a connection request to the base station to thereby establish a communication link with the base station. The base station transmits control information via Physical Downlink Control CHannel (PDCCH) as appropriate to the terminal with which a communication link has been established via a downlink control channel or the like.

The terminal performs "blind-determination" on each of a plurality of pieces of control information included in the received PDCCH signal (i.e., Downlink (DL) Assignment Control Information: also referred to as Downlink Control Information (DCI)). More specifically, each piece of the control information includes a Cyclic Redundancy Check (CRC) part and the base station masks this CRC part using the terminal ID of the transmission target terminal. Accordingly, until the terminal demasks the CRC part of the received piece of control information with its own terminal ID, the terminal cannot determine whether or not the piece of control information is intended for the terminal. In this blind-determination, if the result of demasking the CRC part indicates that the CRC operation is OK, the piece of control information is determined as being intended for the terminal.

Moreover, in 3GPP LTE, Automatic Repeat Request (ARQ) is applied to downlink data to terminals from a base station. More specifically, each terminal feeds back a response signal indicating the result of error detection on the downlink data to the base station. Each terminal performs a CRC on the downlink data and feeds back Acknowledgment (ACK) when CRC=OK (no error) or Negative Acknowledgment (NACK) when CRC=Not OK (error) to the base station as a response signal. An uplink control channel such as Physical Uplink Control Channel (PUCCH) is used to feed back the response signals (i.e., ACK/NACK signals (hereinafter, may be referred to as "A/N," simply)).

The control information to be transmitted from a base station herein includes resource assignment information including information on resources assigned to the terminal by the base station. As described above, PDCCH is used to transmit this control information. This PDCCH includes one or more L1/L2 control channels (L1/L2 CCH). Each L1/L2 CCH consists of one or more Control Channel Elements (CCE). More specifically, a CCE is the basic unit used to map the control information to PDCCH. Moreover, when a single L1/L2 CCH consists of a plurality of CCEs (2, 4 or 8), a plurality of contiguous CCEs starting from a CCE having an even index are assigned to the L1/L2 CCH. The base station assigns the L1/L2 CCH to the resource assignment target terminal in accordance with the number of CCEs required for indicating the control information to the resource assignment target terminal. The base station maps the control information to physical resources corresponding to the CCEs of the L1/L2 CCH and transmits the mapped control information.

In addition, CCEs are associated with component resources of PUCCH (hereinafter, may be referred to as "PUCCH resource") in a one-to-one correspondence. Accordingly, a terminal that has received an L1/L2 CCH identifies the component resources of PUCCH that correspond to the CCEs forming the L1/L2 CCH and transmits a response signal to the base station using the identified resources. However, when the L1/L2 CCH occupies a plurality of contiguous CCEs, the terminal transmits the response signal to the base station using a PUCCH component resource corresponding to a CCE having a smallest index among the plurality of PUCCH component resources respectively corresponding to the plurality of CCEs (i.e., PUCCH component resource associated with a CCE having an even numbered CCE index). In this manner, the downlink communication resources are efficiently used.

As illustrated in FIG. 1, a plurality of response signals transmitted from a plurality of terminals are spread using a Zero Auto-correlation (ZAC) sequence having the characteristic of zero autocorrelation in time-domain, a Walsh sequence and a discrete Fourier transform (DFT) sequence, and are code-multiplexed in a PUCCH. In FIG. 1, ($W_0$, $W_1$, $W_2$, $W_3$) represent a length-4 Walsh sequence and ($F_0$, $F_1$, $F_2$) represent a length-3 DFT sequence. As illustrated in FIG. 1, ACK or NACK response signals are primary-spread over frequency components corresponding to 1 SC-FDMA symbol by a ZAC sequence (length-12) in frequency-domain. More specifically, the length-12 ZAC sequence is multiplied by a response signal component represented by a complex number. Subsequently, the ZAC sequence serving as the response signals and reference signals after the primary-spread is secondary-spread in association with each of a Walsh sequence (length-4: $W_0$-$W_3$ (may be referred to as Walsh Code Sequence)) and a DFT sequence (length-3: $F_0$-$F_2$). More specifically, each component of the signals of length-12 (i.e., response signals after primary-spread or ZAC sequence serving as reference signals (i.e., Reference Signal Sequence) is multiplied by each component of an orthogonal code sequence (i.e., orthogonal sequence: Walsh sequence or DFT sequence). Moreover, the secondary-spread signals are transformed into signals of length-12 in the time-domain by inverse fast Fourier transform (IFFT). A CP is added to each signal obtained by IFFT processing, and the signals of one slot consisting of seven SC-FDMA symbols are thus formed.

The response signals from different terminals are spread using ZAC sequences each corresponding to a different cyclic shift value (i.e., index) or orthogonal code sequences each corresponding to a different sequence number (i.e., orthogonal cover index (OC index)). An orthogonal code sequence is a combination of a Walsh sequence and a DFT sequence. In addition, an orthogonal code sequence is referred to as a block-wise spreading code in some cases. Thus, base stations can demultiplex the code-multiplexed plurality of response signals using the related art despreading and correlation processing (see, NPL 4).

However, it is not necessarily true that each terminal succeeds in receiving a downlink assignment control signal because the terminal performs blind-determination in each subframe to find a downlink assignment control signal intended for the terminal. When the terminal fails to receive the downlink assignment control signal intended for the terminal on a certain downlink component carrier, the terminal would not even know whether or not there is downlink data intended for the terminal on the downlink component carrier. Accordingly, when a terminal fails to receive the downlink assignment control signal intended for the terminal on a certain downlink component carrier, the terminal generates no response signals for the downlink data on the downlink component carrier. This error case is defined as discontinuous transmission of ACK/NACK signals (DTX of response signals) in the sense that the terminal transmits no response signals.

In 3GPP LTE systems (may be referred to as "LTE system," hereinafter), base stations assign resources to uplink data and downlink data, independently. For this reason, in the 3GPP LTE system, terminals (i.e., terminals compliant with LTE system (hereinafter, referred to as "LTE terminal")) encounter a situation where the terminals need to transmit uplink data and response signals for downlink data simultaneously in the uplink. In this situation, the response signals and uplink data from the terminals are transmitted using time-division multiplexing (TDM). As described above, the single carrier properties of transmission waveforms of the terminals are maintained by the simultaneous transmission of response signals and uplink data using TDM.

In addition, as illustrated in FIG. 2, the response signals (i.e., "A/N") transmitted from each terminal partially occupy the resources assigned to uplink data (i.e., Physical Uplink Shared CHannel (PUSCH) resources) (i.e., response signals occupy some SC-FDMA symbols adjacent to SC-FDMA symbols to which reference signals (RS) are mapped) and are thereby transmitted to a base station in time-division multiplexing (TDM). However, "subcarriers" in the vertical axis in FIG. 2 are also termed as "virtual subcarriers" or "time contiguous signals," and "time contiguous signals" that are collectively inputted to a discrete Fourier transform (DFT) circuit in a SC-FDMA transmitter are represented as "subcarriers" for convenience. More specifically, optional data of the uplink data is punctured due to the response signals in the PUSCH resources. Accordingly, the quality of uplink data (e.g., coding gain) is significantly reduced due to the punctured bits of the coded uplink data. For this reason, base stations instruct the terminals to use a very low coding rate and/or to use very large transmission power so as to compensate for the reduced quality of the uplink data due to the puncturing.

Meanwhile, the standardization of 3GPP LTE-Advanced for realizing faster communication than 3GPP LTE is in progress. 3GPP LTE-Advanced systems (may be referred to as "LTE-A system," hereinafter) follow LTE systems. 3GPP LTE-Advanced will introduce base stations and terminals capable of communicating with each other using a wideband frequency of 40 MHz or greater to realize a downlink transmission rate of up to 1 Gbps or above.

In the LTE-A system, in order to simultaneously achieve backward compatibility with the LTE system and ultra-high-speed communication several times faster than transmission rates in the LTE system, the LTE-A system band is divided into "component carriers" of 20 MHz or below, which is the bandwidth supported by the LTE system. In other words, the "component carrier" is defined herein as a band having a maximum width of 20 MHz and as the basic unit of communication band. In the Frequency Division Duplex (FDD) system, moreover, "component carrier" in downlink (hereinafter, referred to as "downlink component carrier") is defined as a band obtained by dividing a band according to downlink frequency bandwidth information in a BCH broadcasted from a base station or as a band defined by a distribution width when a downlink control channel (PDCCH) is distributed in the frequency domain. In addition, "component carrier" in uplink (hereinafter, referred to as "uplink component carrier") may be defined as a band obtained by dividing a band according to uplink frequency band information in a BCH broadcasted from a base station or as the basic unit of a communication band of 20 MHz or below including a Physical Uplink Shared CHannel (PUSCH) in the vicinity of the center of the bandwidth and PUCCH s for LTE on both ends of the band. In addition, the term "component carrier" may be also referred to as "cell" in English in 3GPP LTE-Advanced. Furthermore, "component carrier" may also be abbreviated as CC(s).

In the Time Division Duplex (TDD) system, a downlink component carrier and an uplink component carrier have the same frequency band, and downlink communication and uplink communication are realized by switching between the downlink and uplink on a time division basis. For this reason, in the case of the TDD system, the downlink component carrier can also be expressed as "downlink communication timing in a component carrier." The uplink component carrier can also be expressed as "uplink communication timing in a component carrier." The downlink component carrier and the uplink component carrier are switched based on a UL-DL configuration as shown in FIG. 3. In the UL-DL configuration shown in FIG. 3, timings are configured in subframe units (that is, 1 msec units) for downlink communication (DL) and uplink communication (UL) per frame (10 msec). The UL-DL configuration can construct a communication system capable of flexibly meeting a downlink communication throughput requirement and an uplink communication throughput requirement by changing a subframe ratio between downlink communication and uplink communication. For example, FIG. 3 illustrates UL-DL configurations (Config 0 to 6) having different subframe ratios between downlink communication and uplink communication. In addition, in FIG. 3, a downlink communication subframe is represented by "D," an uplink communication subframe is represented by "U" and a special subframe is represented by "S." Here, the special subframe is a subframe at the time of switchover from a downlink communication subframe to an uplink communication subframe. In the special subframe, downlink data communication may be performed as in the case of the downlink communication subframe. In each UL-DL configuration shown in FIG. 3, subframes (20 subframes) corresponding to 2 frames are expressed in two stages: subframes ("D" and "S" in the upper row) used for downlink communication and subframes ("U" in the lower row) used for uplink communication.

Furthermore, as shown in FIG. 3, an error detection result corresponding to downlink data (ACK/NACK) is indicated in the fourth uplink communication subframe or an uplink communication subframe after the fourth subframe from the subframe to which the downlink data is assigned. In the TDD system, it is necessary to transmit response signals indicating error detection results corresponding to downlink data which has been indicated in a plurality of downlink communication subframes collectively in one uplink communication subframe. The number of downlink communication subframes at this time (which may also be called "bundling window") is represented by M and an index of a downlink communication subframe corresponding to one uplink communication subframe is represented by m. For example, in UL-DL Configuration#2, error detection results on downlink data in four downlink communication subframes SF#4, 5, 6 and 8 of a first frame are indicated in uplink communication subframe SF#3 of a second frame. In this case, M=4, and SF#4, 5, 6 and 8 of the first frame correspond to m=0, 1, 2 and 3 respectively.

In TDD in an LTE-A system, a terminal receives downlink assignment control information via PDCCH and transmits a response signal over an uplink upon receiving downlink data. The following two methods are adopted as the method of transmitting the response signals.

Method 1 is a method (implicit signaling) whereby a terminal transmits a response signal using a PUCCH resource associated, in a one-to-one correspondence, with leading CCE index $n_{CCE}$ of CCE (Control Channel Element) occupied by PDCCH and index m of a downlink communication subframe corresponding to one uplink communication subframe (see PTL 1). Note that m is indexed in time sequence.

More specifically, the terminal first calculates parameter c={0, 1, 2, 3} that satisfies equation 1 in a magnitude relationship between leading CCE index $n_{CCE}$ occupied by PDCCH intended for the terminal (DL assignment) and $N_c$ for each DL subframe m. Note that Nc in equation 1 is calculated according to equation 2. $N^{DL}_{RB}$ in equation 2 is the number of downlink resource blocks and $N^{RB}_{SC}$ is the number of subcarriers per resource block. The terminal then determines PUCCH resources $n^{(1)}_{PUCCH}$ based on DL subframe m and calculated c according to equation 3 (see NPL 3). Note that $N^{(1)}_{PUCCH}$ in equation 3 is an offset value for all PUCCH resources and is a value set in the terminal in advance.

[1]

$$N_c \leq n_{CCE} < N_{c+1}$$ (Equation 1)

[2]

$$N_c = \max\{0, \lfloor [N_{RB}^{DL} \cdot (N_{sc}^{RB} \cdot c - 4)]/36 \rfloor\}$$ (Equation 2)

[3]

$$n_{PUCCH,j}^{(1)} = (M-m-1) \cdot N_c + m \cdot N_{c+1} + n_{CCE,m} + N_{PUCCH}^{(1)}$$ (Equation 3)

As shown in FIG. 4, in TDD, PUCCH resource region 10 corresponding to PDCCH is divided for each c and each partial region corresponding to c is divided for each m. PUCCH resources for each c and each m are arranged from a frequency end direction toward the center direction of a component carrier in ascending order of m and in ascending order of c.

In the example of FIG. 4, when transmitting a response signal indicating an error detection result corresponding to downlink data indicated in a subframe with m=2, the terminal first calculates c from a magnitude relationship between leading CCE index $n_{CCE}$ occupied by PDCCH (DL assignment) intended for the terminal and $N_c$ in virtual PUCCH resource region 50 that collects PUCCH resources corresponding to the subframe with m=2 (equation 1).

Next, the terminal arranges the response signal in PUCCH resource $n^{(1)}_{PUCCH}$ (reference numeral 11 in FIG. 4) in actual PUCCH resource region 10 for the acquired c (c=0 in FIG. 4) (equation 3).

The range of c used here extends as the CCE index increases. A maximum value of the CCE index increases as the scale of the PDCCH region increases. Therefore, the greater the range of c used, the greater the PDCCH region becomes. The scale of the PDCCH region is defined by CFI (Control Format Indicator). For example, the PDCCH region is composed of three OFDM symbols when CFI=3, and it is therefore largest, whereas when CFI=1, the PDCCH region is composed of one OFDM symbol, and it is therefore smallest. Furthermore, CFI is dynamically indicated to the terminal for every subframe. Therefore, the PUCCH resource region is used more frequently when c is smaller. For this reason, the occupancy of control information in the PUCCH resource region increases as c decreases and decreases as c increases.

In the LTE-A system, a control signal may be transmitted using a plurality of PUCCH resources by applying transmission diversity or applying channel selection during carrier aggregation. In this case, as shown in equation 4 and FIG. 5, method 1 uses a predetermined PUCCH resource (reference numeral 11 in FIG. 5) and a PUCCH resource (reference numeral 12 in FIG. 5) adjacent to the PUCCH resource (which becomes $n_{CCE}+1$ with respect to $n_{CCE}$) in the actual PUCCH resource region. In other words, in the LTE-A system, an offset of +1 is added to the CCE index in the actual PUCCH resource region.

[4]

$$n_{PUCCH,j+1}^{(1)} = (M-m-1) \cdot N_c + m \cdot N_{c+1} + n_{CCE,m} + 1 + N_{PUCCH}^{(1)}$$ (Equation 4)

Method 2 is a method (explicit signaling) whereby a base station indicates PUCCH resources to a terminal in advance and the terminal transmits a response signal using the PUCCH resources indicated in advance from the base station.

According to method 2, the base station can dynamically indicate to the terminal, information (ARI (Ack/Nack Resource Indicator)) indicating one PUCCH resource from among a plurality of PUCCH resources through DL assignment in advance. This makes it possible to dynamically switch between quasi-static PUCCH resources with a small number of bits. For example, when ARI has 2 bits, the base station can select one of four PUCCH resources.

In the LTE-A system, various devices are introduced as radio communication terminals such as M2M (Machine to Machine) communication, and the number of multiplexed terminals tends to increase by MIMO transmission techniques, and therefore the number of control signals transmitted from a base station to a terminal is considered to increase. For this reason, there may not be enough PDCCH regions which are regions in which PDCCHs used for control signals are mapped. When the base station cannot transmit control signals due to this shortage of resources, the base station can no longer assign data to the terminal. For this reason, the terminal can no longer use a PUSCH region to be used for data even if the PUSCH region is free and the system throughput may deteriorate.

As a method of solving this shortage of resources, studies are being carried out on the possibility of mapping control signals intended for terminals under a base station to a PDSCH region as well. This region in which control signals intended for terminals under the base station are mapped, that is, a region available to both control signals and data is called "enhanced PDCCH (ePDCCH) region." Thus, the base station can transmit more control signals to terminals by providing ePDCCHs, and can thereby realize various kinds of control. For example, the base station can perform transmission power control on control signals transmitted to a terminal located near a cell edge or control of interference of transmitted control signals with another cell or control of interference of another cell with the cell formed by the base station.

In LTE, DL assignment instructing downlink data assignment (PDSCH) and UL grant instructing uplink data assignment are transmitted using PDCCH.

In LTE-Advanced, DL assignment and UL grant are transmitted also using ePDCCH in the same way as PDCCH. Studies are being carried out on the possibility that resources to which DL assignment is mapped and resources to which UL grant is mapped will be divided on the frequency axis in an ePDCCH region.

Methods 1 and 2 described above are defined as the method of determining PUCCH resources in a PUCCH resource region when DL assignment is indicated in a PDCCH region (hereinafter referred to as "PDCCH-PUCCH resource region"). Furthermore, in method 2, it is defined that a preset PUCCH resource is selected by dynamic ARI.

Here, when a PUCCH resource region in the case where DL assignment is indicated in an ePDCCH region (hereinafter referred to as "ePDCCH-PUCCH resource region") is secured aside from a PDCCH-PUCCH resource region, the total amount of the PUCCH resource region increases. Especially when carrier aggregation is applied, PUCCH is transmitted using only one cell to avoid PAPR (Peak-to-Average Power Ratio) of the terminal from increasing. The cell is always PCell. PCell is generally a macro cell having a large coverage and high mobility is secured by a macro cell transmitting PUCCH. The capacity of PUCCH resources may be tight in the future due to not only introduction of ePDCCH but also introduction of carrier aggregation or introduction of M2M whereby many terminals perform data communication. Thus, in the LTE-A system, studies are being carried out on operation of causing ePDCCH-PUCCH resource regions to overlap with PDCCH-PUCCH resource regions.

As a method of determining ePDCCH-PUCCH resources, a method of instructing a preset offset value for an eCCE index using ARI or a method of defining a fixed value (equation 5) (see NPL 5). According to these methods, the base station first determines whether or not ePDCCH-PUCCH resources with offset value 0, that is, through implicit signaling, collide with PDCCH-PUCCH resources. When no collision occurs, the base station indicates ARI=0 to the terminal so as to use the ePDCCH-PUCCH resources. On the other hand, when collision occurs, the base station sequentially determines collision or no collision using ePDCCH-PUCCH resources with other offset values added thereto and indicates ARI or a fixed value corresponding to a non-colliding ePDCCH-PUCCH resource to the terminal.

[5]

$$n_{PUCCH}^{E} = n_{E\text{-}CCE} + N_{PUCCH}^{(1)} + ARI \qquad \text{(Equation 5)}$$

In ePDCCH, values such as 4, 8, 16, 32 are taken as scale $N_{eCCE}$ of one ePDCCH search space. However, values such as 2, 4, 8, 16 are taken as $N_{eCCE}$ in the case of a special subframe where the number of OFDM symbols to be used for the downlink is small (that is, the case where a configuration with a small number of OFDM symbols to be used for the downlink is set as a special subframe configuration in which the number of OFDM symbols to be used for downlink communication in a special subframe, a gap (downlink/uplink switching period) and a ratio of the number of OFDM symbols to be used for uplink communication are set). Furthermore, the base station can set ePDCCH search space sets which are different between terminals and these ePDCCH search space sets may have different sizes. The base station can further set a plurality of ePDCCH search space sets in one terminal and these ePDCCH search space sets may have different scales. The base station can further set $N^{(1)}_{PUCCH}$ as start positions of different PUCCH resources for the respective ePDCCH search space sets.

CITATION LIST

Patent Literature

PTL 1
Japanese Unexamined Patent Application Publication (Translation of PCT Application) No. 2011-507704

Non-Patent Literature

NPL 1
3GPP TS 36.211 V10.1.0, "Physical Channels and Modulation (Release 10)," March 2011
NPL 2
3GPP TS 36.212 V10.1.0, "Multiplexing and channel coding (Release 10)," March 2011
NPL 3
3GPP TS 36.213 V10.1.0, "Physical layer procedures (Release 10)," March 2011
NPL 4
Seigo Nakao, Tomofumi Takata, Daichi Imamura, and Katsuhiko Hiramatsu, "Performance enhancement of E-UTRA uplink control channel in fast fading environments," Proceeding of IEEE VTC 2009 spring, April. 2009
NPL 5
Samsung, 3GPP RAN1 meeting #68bis, R1-121647, "HARQ-ACK PUCCH Resources in Response to E-PDCCH Detections," March 2012

SUMMARY OF INVENTION

Technical Problem

As shown in FIG. 6, ePDCCH-PUCCH resource region 20 may be divided for each c' and each m as in the case of PDCCH-PUCCH resource region 10 shown in FIGS. 4 and 5. At this time, PUCCH resources are arranged in ascending order of m and in ascending order of c' from the frequency end direction to center direction of a component carrier. When ARI has 2 bits, one of four different offset values $\delta_0 (=0)$, $\delta_1$, $\delta_2$ and $\delta_3$ is indicated to the terminal. At least two offset values are greater than "+1." For this reason, when m for a DL subframe at certain timing is assumed to be $m_{current}$, the possibility that a PUCCH resource as the offset destination may become $m > m_{current}$ is higher than "+1" which is the offset value applicable in the PDCCH-PUCCH resource region.

For example, in FIG. 6, when m=1, suppose ePDCCH-PUCCH resource 21 with offset value $\delta_0 = 0$ in terminal A to which ePDCCH is indicated with eCCE index $n_{eCCE}$ collides with a PDCCH-PUCCH resource in another terminal B to which PDCCH is indicated with CCE index $n_{CCE}$. In this case, the base station determines collision or no collision regarding PUCCH resources 22, 23 and 24 which correspond to PUCCH resource 21 with offset values $\delta_1$, $\delta_2$ and $\delta_3$ added thereto respectively to avoid collision. The base station then indicates to terminal A, one of ARI=1, 2 and 3 corresponding to a resource among PUCCH resources 22, 23 and 24 in which no collision has occurred. However, in the example of FIG. 6, PUCCH resource 23 which is the destination of a shift corresponding to $\delta_2$ becomes a PUCCH resource corresponding to m=2 and PUCCH resource 24 which is the destination of a shift corresponding to $\delta_3$ becomes a PUCCH resource corresponding to m=3. This means that at a point in time of DL subframe m=1, control information mapped to an ePDCCH-PUCCH resource will occupy PUCCH resources when m=2 and m=3 which are future DL subframes. Since PUCCH resources are associated with PDCCH and ePDCCH respectively in a one-to-one correspondence, this means that the base station cannot perform scheduling on the PDCCH and ePDCCH when m=2 and m=3 which are future DL subframes.

Thus, the prior art imposes constraints on scheduling for future DL subframes when downlink data assignment is instructed by ePDCCH. The constraints increase as the value of m increases. Therefore, it is more likely that the base station cannot assign control information to an optimum terminal regarding large m. The base station may need scheduling taking into account an interval between subframes, which may cause a base station scheduler to be more complicated.

An object of the present invention is to provide a method of determining a PUCCH resource to be used to indicate a response signal indicating an error detection result of downlink data without imposing constraints on scheduling for future DL subframes when downlink data assignment is indicated by ePDCCH.

Solution to Problem

As described above, a terminal apparatus according to an aspect of the present invention is a terminal apparatus including: a control section that arranges a response signal on a predetermined PUCCH resource in an uplink control channel (PUCCH) resource region corresponding to an enhanced downlink control channel (ePDCCH); and a transmitting section that transmits the response signal arranged on the PUCCH resource, in which the PUCCH resource region is divided into a plurality of partial regions, and each of the partial regions is divided into a number of downlink communication subframes, PUCCH resources for each index c' of the partial region and each index m indicating a time-sequential order of the downlink communication subframe are arranged in the PUCCH resource region in ascending order of indices m and in ascending order of indices c', and the control section arranges a response signal corresponding to an m-th downlink communication subframe in a PUCCH resource selected from among the PUCCH resources corresponding to the indices in and below.

A transmission method according to an aspect of the present invention is a transmission method including: making a control to arrange a response signal on a predetermined PUCCH resource in an uplink control channel (PUCCH) resource region corresponding to an enhanced downlink control channel (ePDCCH); and transmitting the response signal arranged on the PUCCH resource, in which the PUCCH resource region is divided into a plurality of partial regions, and each of the partial regions is divided into a number of downlink communication subframes, PUCCH resources for each index c' of the partial region and each index m indicating a time-sequential order of the downlink communication subframe are arranged in the PUCCH resource region in ascending order of m and in ascending order of c', and in the making a control, a response signal corresponding to an m-th downlink communication subframe is arranged in a PUCCH resource selected from among the PUCCH resources corresponding to the indices m and below.

Advantageous Effects of Invention

According to the present invention, when downlink data assignment is indicated by ePDCCH, it is possible to determine a PUCCH resource to be used to indicate a response signal indicating an error detection result of downlink data without imposing constraints on scheduling for future DL subframes.

DESCRIPTION OF EMBODIMENTS

Figure 1:
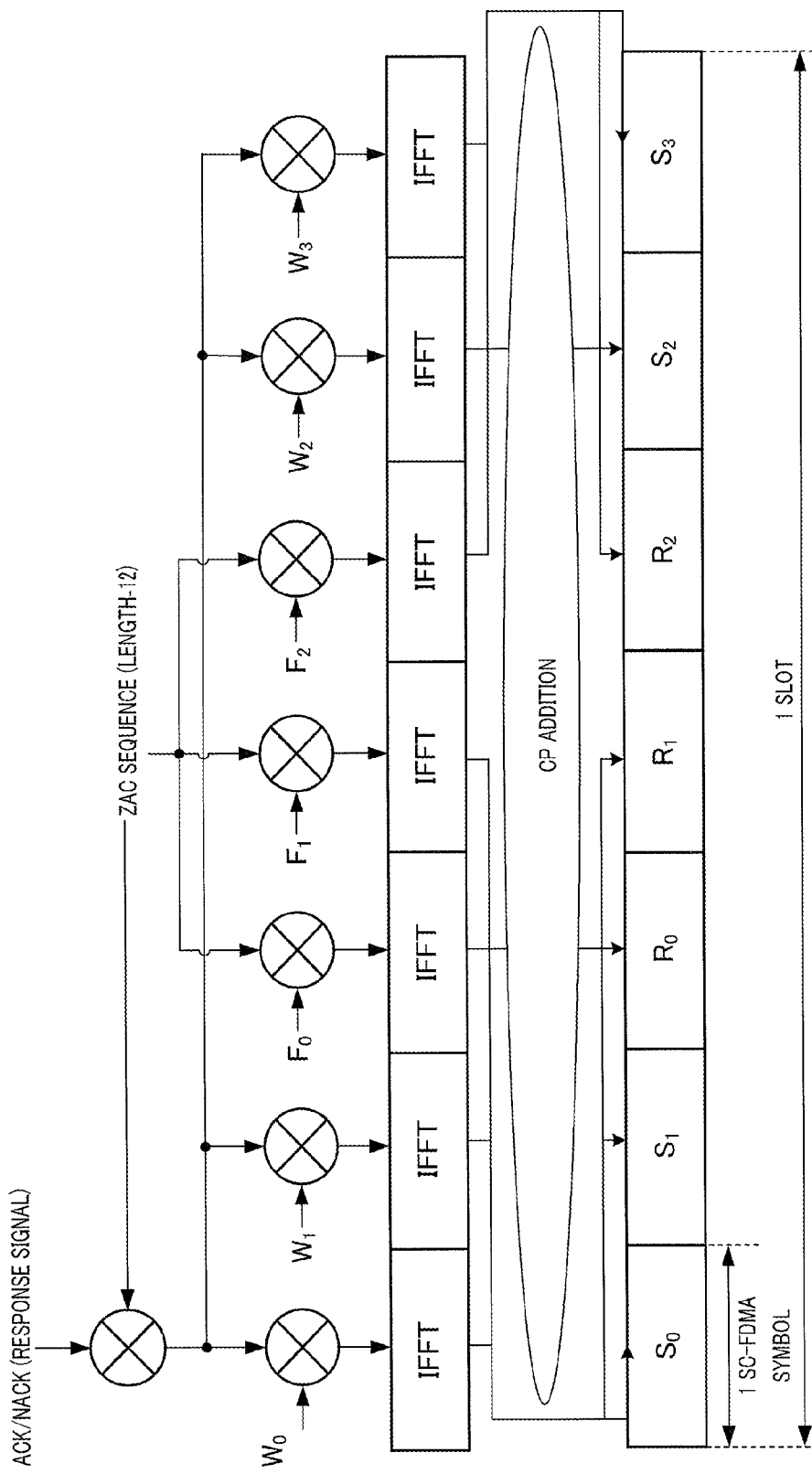
FIG. 1 is a diagram illustrating a method of spreading response signals and reference signals.
Figure 2:
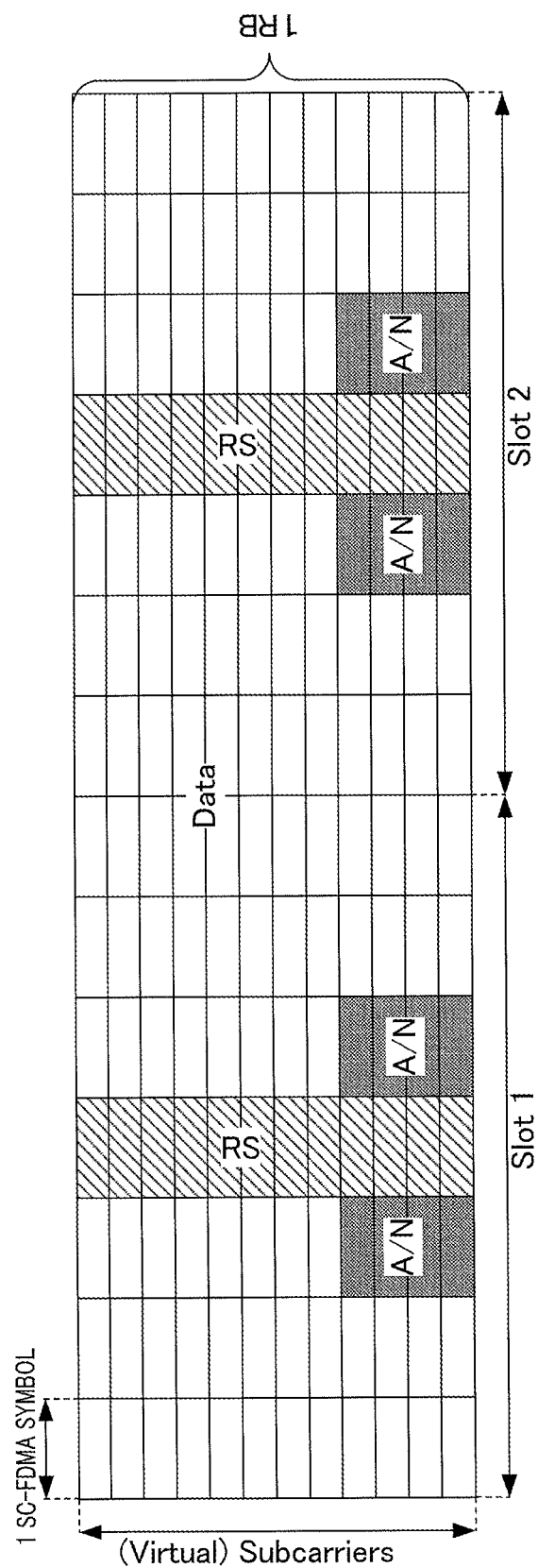
FIG. 2 is a diagram illustrating an operation related to a case where TDM is applied to response signals and uplink data on PUSCH resources.

Hereinafter, embodiments of the present invention will be described in detail with reference to the accompanying drawings. Throughout the embodiments, the same elements as those already described are assigned the same reference numerals and any detailed description of the elements is omitted.

Embodiment 1

Figure 7:
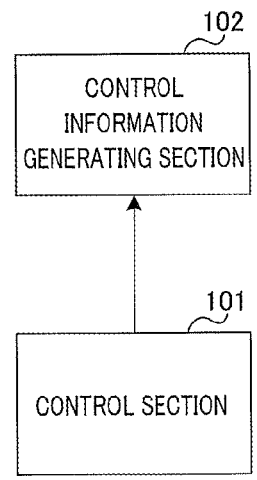
FIG. 7 is a block diagram illustrating a main configuration of a base station according to Embodiment 1 of the present invention.
Figure 8:
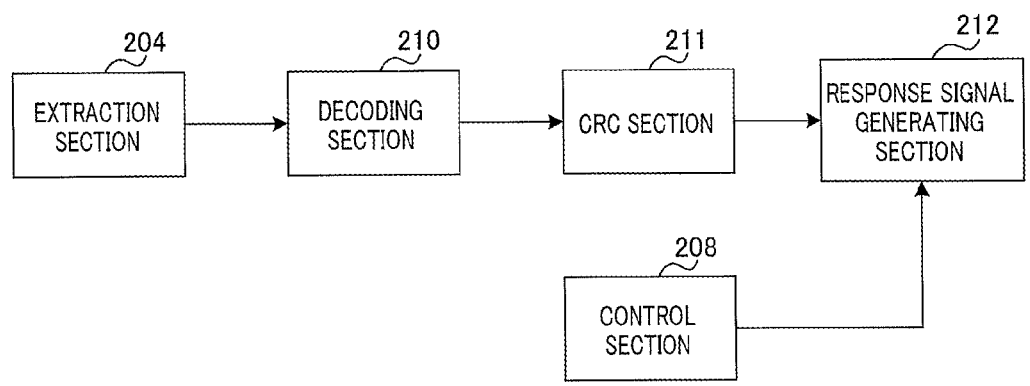
FIG. 8 is a block diagram illustrating a main configuration of a terminal according to Embodiment 1 of the present invention.

FIG. 7 is a block diagram illustrating a main configuration of base station 100 according to the present embodiment. FIG. 8 is a block diagram illustrating a main configuration of terminal 200 according to Embodiment 1 of the present invention. Terminal 200 communicates with base station 100 using a plurality of component carriers including a first component carrier and a second component carrier. A subframe configuration pattern making up one frame, which is a configuration pattern (DL-UL Configuration) including a downlink communication subframe (DL subframe) used for downlink communication and an uplink communication subframe (UL subframe) used for uplink communication is set in each component carrier set in terminal 200.

In base station 100, control section 101 determines collision or no collision between ePDCCH-PUCCH resources and PDCCH-PUCCH resources. Control information generating section 102 indicates ARI corresponding to non-colliding ePDCCH-PUCCH resources to terminal 200.

In terminal 200, extraction section 204 receives downlink data using a plurality of component carriers. Decoding section 210 decodes downlink data. CRC section 211 detects an error of decoded downlink data. Response signal generating section 212 generates response signals using error detection result of the downlink data obtained in CRC section 211. Control section 208 arranges response signals in predetermined PUCCH resources and transmits the response signals to base station 100.

[Configuration of Base Station]

Figure 9:
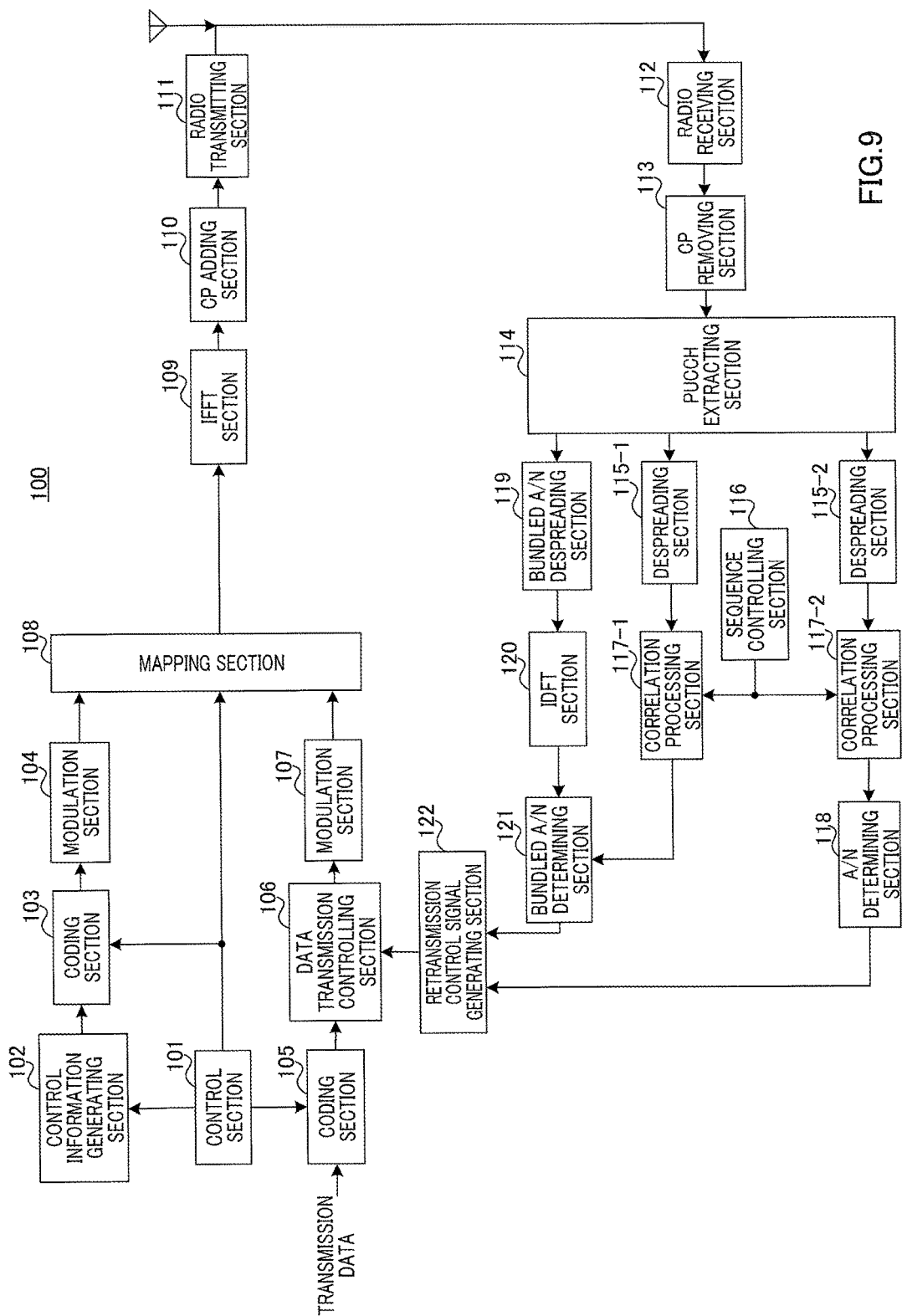
FIG. 9 is a block diagram illustrating a configuration of the base station according to Embodiment 1 of the present invention.

FIG. 9 is a configuration diagram of base station 100 according to Embodiment 1 of the present invention. In FIG. 9, base station 100 includes control section 101, control information generating section 102, coding section 103, modulation section 104, coding section 105, data transmission controlling section 106, modulation section 107, mapping section 108, inverse fast Fourier transform (IFFT) section 109, CP adding section 110, radio transmitting section 111, radio receiving section 112, CP removing section 113, PUCCH extracting section 114, despreading section 115, sequence controlling section 116, correlation processing section 117, A/N determining section 118, bundled A/N despreading section 119, inverse discrete Fourier transform (IDFT) section 120, bundled A/N determining section 121 and retransmission control signal generating section 122.

Control section 101 assigns a downlink resource for transmitting control information (i.e., downlink control information assignment resource) and a downlink resource for transmitting downlink data (i.e., downlink data assignment resource) for a resource assignment target terminal (hereinafter, referred to as "destination terminal" or simply "terminal") 200. This resource assignment is performed in a downlink component carrier included in a component carrier group configured for resource assignment target terminal 200. In addition, the downlink control information assignment resource is selected from among the resources corresponding to downlink control channel (i.e., PDCCH or ePDCCH) in each downlink component carrier. Moreover, the downlink data assignment resource is selected from among the resources corresponding to downlink data channel (i.e., PDCCH) in each downlink component carrier. In addition, when there are a plurality of resource assignment target terminals 200, control section 101 assigns different resources to terminals 200, respectively.

The downlink control information assignment resources are equivalent to L1/L2 CCH described above. More specifically, the downlink control information assignment resources are each formed of one or a plurality of CCEs or eCCEs.

Control section 101 determines whether or not ePDCCH-PUCCH resources collide with PDCCH-PUCCH resources and controls control information generating section 102 so as to generate ARI based on the determination result.

Control section 101 determines the coding rate used for transmitting control information to resource assignment target terminal 200. The data size of the control information varies depending on the coding rate. Thus, control section 101 assigns a downlink control information assignment resource having the number of CCEs or eCCEs that allows the control information having this data size to be mapped to the resource.

Control section 101 outputs information on the downlink data assignment resource to control information generating section 102. Moreover, control section 101 outputs information on the coding rate to coding section 103. In addition, control section 101 determines and outputs the coding rate of transmission data (i.e., downlink data) to coding section 105. Moreover, control section 101 outputs information on the downlink data assignment resource and downlink control information assignment resource to mapping section 108. However, control section 101 controls the assignment in such a way that the downlink data and downlink control information for the downlink data are mapped to the same downlink component carrier.

Control information generating section 102 generates and outputs control information including the information on the downlink data assignment resource and ARI to coding section 103. This control information is generated for each downlink component carrier. In addition, when there are a plurality of resource assignment target terminals 200, the control information includes the terminal ID of each destination terminal 200 in order to distinguish resource assignment target terminals 200 from one another. For example, the control information includes CRC bits masked by the terminal ID of destination terminal 200. This control information may be referred to as "control information carrying downlink assignment" or "downlink control information (DCI)."

Coding section 103 encodes the control information using the coding rate received from control section 101 and outputs the coded control information to modulation section 104.

Modulation section 104 modulates the coded control information and outputs the resultant modulation signals to mapping section 108.

Coding section 105 inserts the coding rate information from control section 101 into transmission data (downlink data) for each destination terminal 200 and encodes and outputs the transmission data after the insertion to data transmission controlling section 106. However, when a plurality of downlink component carriers are assigned to destination terminal 200, coding section 105 encodes transmission data to be transmitted by each downlink component carrier.

Data transmission controlling section 106 outputs the coded transmission data to modulation section 107 and also keeps the coded transmission data at the initial transmission. The coded transmission data is kept for each destination terminal 200. Transmission data to one destination terminal 200 is kept for each downlink component carrier for transmission. This makes it possible to perform not only retransmission control of the entire data transmitted to destination terminal 200 but also retransmission control for each downlink component carrier.

Furthermore, upon reception of a NACK or DTX for downlink data transmitted on a predetermined downlink component carrier from retransmission control signal generating section 122, data transmission controlling section 106 outputs the data kept in the manner described above and corresponding to this downlink component carrier to modulation section 107. Upon reception of an ACK for the downlink data transmitted on a certain downlink component carrier from retransmission control signal generating section 122, data transmission controlling section 106 deletes the data kept in the manner described above and corresponding to this downlink component carrier.

Modulation section 107 modulates the coded transmission data received from data transmission controlling section 106 and outputs the resultant modulation signals to mapping section 108.

Mapping section 108 maps the modulation signals of the control information received from modulation section 104 to the resource (PDCCH) indicated by the downlink control information assignment resource received from control section 101 and outputs the resultant modulation signals to IFFT section 109.

Mapping section 108 maps the modulation signals of the transmission data received from modulation section 107 to the resource (i.e., PDSCH (i.e., downlink data channel)) indicated by the downlink data assignment resource received from control section 101 (i.e., information included in the control information) and outputs the resultant modulation signals to IFFT section 109.

IFFT section 109 performs IFFT processing on the modulation signals mapped in mapping section 108 and outputs the modulation signals to CP adding section 110. This causes the modulation signals to be transformed from frequency-domain to time-domain signals.

CP adding section 110 adds the same signal as that of the tail portion after IFFT to the leading part thereof as a CP to form an OFDM signal and outputs the OFDM signal to radio transmitting section 111.

Radio transmitting section 111 performs transmission processing such as D/A (digital to analog) conversion, amplification and up-conversion on the OFDM signal and transmits the OFDM signal to terminal 200 via an antenna.

Radio receiving section 112 receives uplink response signals or reference signals transmitted from terminal 200 via the antenna, performs reception processing such as down-conversion, A/D conversion on the uplink response signals or reference signals and outputs the signals to CP removing section 113.

CP removing section 113 removes a CP added to the uplink response signals or reference signals after the reception processing and outputs the signals to PUCCH extracting section 114.

PUCCH extracting section 114 extracts, from the PUCCH signals included in the received signals, the signals in the PUCCH region corresponding to the bundled ACK/NACK resource previously indicated to terminal 200. Here, the bundled ACK/NACK resource is a PUCCH resource by which a bundled ACK/NACK signal should be transmitted as described above and a resource that adopts a DFT-S-OFDM format configuration. More specifically, PUCCH extracting section 114 extracts the data part of the PUCCH region corresponding to the bundled ACK/NACK resource (i.e., SC-FDMA symbols on which the bundled ACK/NACK resource is assigned) and the reference signal part of the PUCCH region (i.e., SC-FDMA symbols on which the reference signals for demodulating the bundled ACK/NACK signals are assigned). PUCCH extracting section 114 outputs the extracted data part to bundled A/N despreading section 119 and outputs the reference signal part to despreading section 115-1.

PUCCH extracting section 114 extracts, from the PUCCH signals included in the received signals, a plurality of PUCCH regions corresponding to A/N resources associated with CCEs occupied by PDCCH used for transmission of downlink assignment control information (DCI), A/N resources associated with eCCEs occupied by ePDCCH used for transmission of downlink assignment control information (DCI) and a plurality of A/N resources previously indicated to terminal 200. The A/N resource herein refers to the resource to be used for transmission of an A/N. More specifically, PUCCH extracting section 114 extracts the data part of the PUCCH region corresponding to the A/N resource (i.e., SC-FDMA symbols on which the uplink control signals are assigned) and the reference signal part of the PUCCH region (i.e., SC-FDMA symbols on which the reference signals for demodulating the uplink control signals are assigned). PUCCH extracting section 114 outputs both of the extracted data part and reference signal part to despreading section 115-2. In this manner, the response signals are received on the resource selected from the PUCCH resource associated with the CCE or eCCE and the specific PUCCH resource previously indicated to terminal 200. Note that the method of determining A/N resources (PUCCH resources to which response signals are mapped) will be described later.

Sequence controlling section 116 generates a base sequence that may be used for spreading each of the A/N indicated from terminal 200, the reference signals for the A/N, and the reference signals for the bundled ACK/NACK signals (i.e., length-12 ZAC sequence). In addition, sequence controlling section 116 identifies a correlation window corresponding to a resource on which the reference signals may be assigned (hereinafter, referred to as "reference signal resource") in PUCCH resources that may be used by terminal 200. Sequence controlling section 116 outputs the information indicating the correlation window corresponding to the reference signal resource on which the reference signals may be assigned in bundled ACK/NACK resources and the base sequence to correlation processing section 117-1. Sequence controlling section 116 outputs the information indicating the correlation window corresponding to the reference signal resource and the base sequence to correlation processing section 117-1. In addition, sequence controlling section 116 outputs the information indicating the correlation window corresponding to the A/N resources on which an A/N and the reference signals for the A/N are assigned and the base sequence to correlation processing section 117-2.

Despreading section 115-1 and correlation processing section 117-1 perform processing on the reference signals extracted from the PUCCH region corresponding to the bundled ACK/NACK resource.

More specifically, despreading section 115-1 despreads the reference signal part using a Walsh sequence to be used in secondary-spreading for the reference signals of the bundled ACK/NACK resource by terminal 200 and outputs the despread signals to correlation processing section 117-1.

Correlation processing section 117-1 uses the information indicating the correlation window corresponding to the reference signal resource and the base sequence and thereby finds a correlation value between the signals received from despreading section 115-1 and the base sequence that may be used in primary-spreading in terminal 200. Correlation processing section 117-1 outputs the correlation value to bundled A/N determining section 121.

Despreading section 115-2 and correlation processing section 117-2 perform processing on the reference signals and A/Ns extracted from the plurality of PUCCH regions corresponding to the plurality of A/N resources.

More specifically, despreading section 115-2 despreads the data part and reference signal part using a Walsh sequence and a DFT sequence to be used in secondary-spreading for the data part and reference signal part of each of the A/N resources by terminal 200, and outputs the despread signals to correlation processing section 117-2.

Correlation processing section 117-2 uses the information indicating the correlation window corresponding to each of the A/N resources and the base sequence and thereby finds a correlation value between the signals received from despreading section 115-2 and a base sequence that may be used in primary-spreading by terminal 200. Correlation processing section 117-2 outputs each correlation value to A/N determining section 118.

A/N determining section 118 determines, on the basis of the plurality of correlation values received from correlation processing section 117-2, which of the A/N resources is used to transmit the signals from terminal 200 or none of the A/N resources is used. When determining that the signals are transmitted using one of the A/N resources from terminal 200, A/N determining section 118 performs coherent detection using a component corresponding to the reference signals and a component corresponding to the A/N and outputs the result of coherent detection to retransmission control signal generating section 122. Meanwhile, when determining that terminal 200 uses none of the A/N resources, A/N determining section 118 outputs the determination result indicating that none of the A/N resources is used to retransmission control signal generating section 122.

Bundled A/N despreading section 119 despreads, using a DFT sequence, the bundled ACK/NACK signals corresponding to the data part of the bundled ACK/NACK resource received from PUCCH extracting section 114 and outputs the despread signals to IDFT section 120.

IDFT section 120 transforms the bundled ACK/NACK signals in the frequency-domain received from bundled A/N despreading section 119 into time-domain signals by IDFT processing and outputs the bundled ACK/NACK signals in the time-domain to bundled A/N determining section 121.

Bundled A/N determining section 121 demodulates the bundled ACK/NACK signals corresponding to the data part of the bundled ACK/NACK resource received from IDFT section 120, using the reference signal information on the bundled ACK/NACK signals that is received from correlation processing section 117-1. In addition, bundled A/N determination section 121 decodes the demodulated bundled ACK/NACK signals and outputs the result of decoding to retransmission control signal generating section 122 as the bundled A/N information. However, when the correlation value received from correlation processing section 117-1 is smaller than a threshold, and bundled A/N determining section 121 thus determines that terminal 200 does not use any bundled A/N resource to transmit the signals, bundled A/N determining section 121 outputs the result of determination to retransmission control signal generating section 122.

Retransmission control signal generating section 122 determines whether or not to retransmit the data transmitted on the downlink component carrier (i.e., downlink data) on the basis of the information inputted from bundled A/N determining section 121 and the information inputted from A/N determining section 118 and generates retransmission control signals based on the result of determination. More specifically, when determining that downlink data transmitted on a certain downlink component carrier needs to be retransmitted, retransmission control signal generating section 122 generates retransmission control signals indicating a retransmission command for the downlink data and outputs the retransmission control signals to data transmission controlling section 106. In addition, when determining that the downlink data transmitted on a certain downlink component carrier does not need to be retransmitted, retransmission control signal generating section 122 generates retransmission control signals indicating not to retransmit the downlink data transmitted on the downlink component carrier and outputs the retransmission control signals to data transmission controlling section 106.

(Configuration of Terminal)

Figure 10:
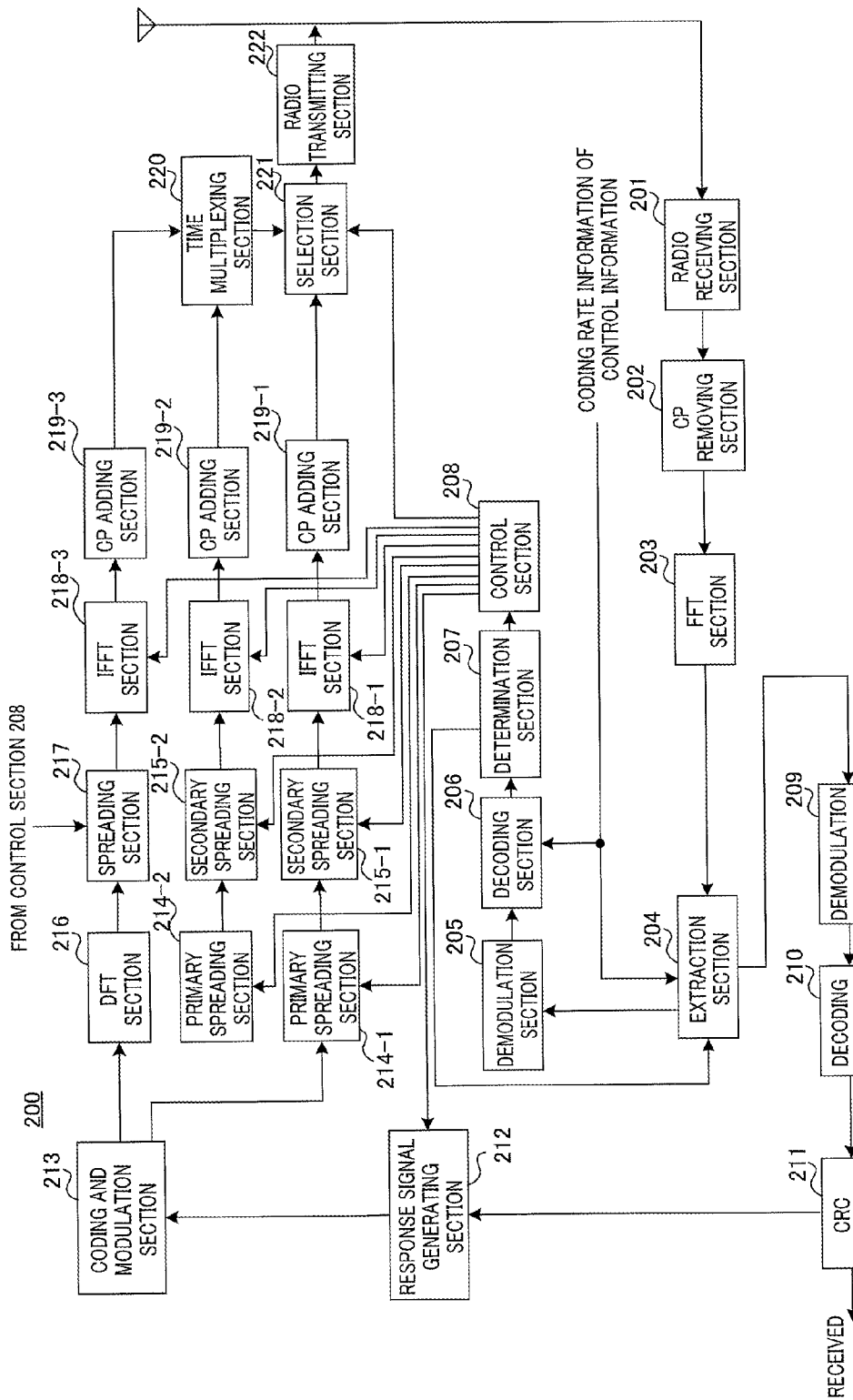
FIG. 10 is a block diagram illustrating a configuration of the terminal according to Embodiment 1 of the present invention.

FIG. 10 is a block diagram illustrating a configuration of terminal 200 according to Embodiment 1. In FIG. 10, terminal 200 includes radio receiving section 201, CP removing section 202, fast Fourier transform (FFT) section 203, extraction section 204, demodulation section 205, decoding section 206, determination section 207, control section 208, demodulation section 209, decoding section 210, CRC section 211, response signal generating section 212, coding and modulation section 213, primary-spreading sections 214-1 and 214-2, secondary-spreading sections 215-1 and 215-2, DFT section 216, spreading section 217, IFFT sections 218-1, 218-2 and 218-3, CP adding sections 219-1, 219-2 and 219-3, time-multiplexing section 220, selection section 221 and radio transmitting section 222.

Radio receiving section 201 receives, via an antenna, an OFDM signal transmitted from base station 100, performs reception processing such as down-conversion, A/D conversion and/or the like on the received OFDM signal and outputs the OFDM signal to CP removing section 202. It should be noted that the received OFDM signal includes a PDSCH signal assigned to a resource in a PDSCH (i.e., downlink data), PDCCH signal assigned to a resource in a PDCCH signal or ePDCCH signal assigned to a resource in an ePDCCH.

CP removing section 202 removes a CP that has been added to the OFDM signal from the OFDM signal that have undergone the reception processing and outputs the OFDM signal to FFT section 203.

FFT section 203 transforms the received OFDM signal from which the CP has been removed into a frequency-domain signal by FFT processing and outputs the resultant received signal to extraction section 204.

Extraction section 204 extracts, from the received signal to be received from FFT section 203, a downlink control channel signal (i.e., PDCCH signal or ePDCCH signal) in accordance with coding rate information to be received. That is, since the number of CCEs or eCCEs forming a downlink control information assignment resource varies depending on the coding rate, extraction section 204 uses the number of CCEs or eCCEs that corresponds to the coding rate as units of extraction processing, and extracts a downlink control channel signal and outputs the downlink control channel signal to demodulation section 205. Note that the downlink control channel signal is extracted for each downlink component carrier.

Extraction section 204 extracts downlink data (i.e., downlink data channel signal (i.e., PDSCH signal)) from the received signals on the basis of information on the downlink data assignment resource intended for terminal 200 to be received from determination section 207 to be described, hereinafter, and outputs the downlink data to demodulation section 209. As described above, extraction section 204 receives the downlink assignment control information (i.e., DCI) mapped to the PDCCH or ePDCCH and receives the downlink data on the PDSCH.

Demodulation section 205 demodulates the downlink control channel signal received from extraction section 204 and outputs the obtained result of demodulation to decoding section 206.

Decoding section 206 decodes the result of demodulation received from demodulation section 205 in accordance with the received coding rate information and outputs the obtained result of decoding to determination section 207.

Determination section 207 performs blind-determination (i.e., monitoring) to find out whether or not the control information included in the result of decoding received from decoding section 206 is the control information intended for terminal 200. This determination is made in units of decoding results corresponding to the units of extraction processing. For example, determination section 207 demasks the CRC bits by the terminal ID of terminal 200 and determines that the control information resulted in CRC=OK (no error) as the control information intended for terminal 200. Determination section 207 outputs information on the downlink data assignment resource intended for terminal 200, which is included in the control information intended for terminal 200, to extraction section 204.

In addition, when detecting the control information (i.e., downlink assignment control information) intended for terminal 200, determination section 207 informs control section 208 that an ACK/NACK signal will be generated (or is present). Moreover, when detecting the control information intended for terminal 200 from a PDCCH signal or ePDCCH signal, determination section 207 outputs information on a CCE that has been occupied by the PDCCH or information on an eCCE that has been occupied by the ePDCCH to control section 208.

Control section 208 identifies the A/N resource associated with the CCE or the eCCE on the basis of the information on the CCE or the eCCE received from determination section 207. Control section 208 outputs the A/N resource associated with the CCE, the A/N resource associated with the eCCE or base sequence and cyclic shift amount corresponding to the A/N resource indicated in advance from base station 100 to primary-spreading section 214-1 and outputs a Walsh sequence and a DFT sequence corresponding to the A/N resource to secondary-spreading section 215-1. In addition, control section 208 outputs the frequency resource information on the A/N resource to IFFT section 218-1. Note that the method of determining A/N resources (PUCCH resources to which response signals are mapped) will be described later.

When determining to transmit a bundled ACK/NACK signal using a bundled ACK/NACK resource, control section 208 outputs the base sequence and cyclic shift value corresponding to the reference signal part (i.e., reference signal resource) of the bundled ACK/NACK resource previously indicated by base station 100 to primary-despreading section 214-2 and outputs a Walsh sequence to secondary-despreading section 215-2. In addition, control section 208 outputs the frequency resource information on the bundled ACK/NACK resource to IFFT section 218-2.

Control section 208 outputs a DFT sequence used for spreading the data part of the bundled ACK/NACK resource to spreading section 217 and outputs the frequency resource information on the bundled ACK/NACK resource to IFFT section 218-3.

Control section 208 selects the bundled ACK/NACK resource or the A/N resource and instructs selection section 221 to output the selected resource to radio transmitting section 222. Moreover, control section 208 instructs response signal generating section 212 to generate the bundled ACK/NACK signal or the ACK/NACK signal in accordance with the selected resource.

Demodulation section 209 demodulates the downlink data received from extraction section 204 and outputs the demodulated downlink data to decoding section 210.

CRC section 211 performs error detection on the decoded downlink data received from decoding section 210, for each downlink component carrier using CRC and outputs an ACK when CRC=OK (no error) or outputs a NACK when CRC=Not OK (error) to response signal generating section 212. Moreover, CRC section 211 outputs the decoded downlink data as the received data when CRC=OK (no error).

Response signal generating section 212 generates response signals on the basis of the reception condition of downlink data (i.e., result of error detection on downlink data) on each downlink component carrier inputted from CRC section 211 and information indicating a predetermined group number. More specifically, when instructed to generate the bundled ACK/NACK signal from control section 208, response signal generating section 212 generates the bundled ACK/NACK signals including the results of error detection for the respective component carriers as individual pieces of data. Meanwhile, when instructed to generate ACK/NACK signals from control section 208, response signal generating section 212 generates an ACK/NACK signal of one symbol. Response signal generating section 212 outputs the generated response signal to coding and modulation section 213.

Upon reception of the bundled ACK/NACK signal, coding and modulation section 213 encodes and modulates the received bundled ACK/NACK signal to generate the modulation signal of 12 symbols and outputs the modulation signal to DFT section 216. In addition, upon reception of the ACK/NACK signal of one symbol, coding and modulation section 213 modulates the ACK/NACK signal and outputs the modulation signal to primary-spreading section 214-1.

Primary-spreading sections 214-1 and 214-2 corresponding to the A/N resources and reference signal resources of the bundled ACK/NACK resources spread the ACK/NACK signals or reference signals using the base sequence corresponding to the resources in accordance with the instruction from control section 208 and output the spread signals to secondary-spreading sections 215-1 and 215-2.

Secondary-spreading sections 215-1 and 215-2 spread the received primary-spread signals using a Walsh sequence or a DFT sequence in accordance with an instruction from control section 208 and outputs the spread signals to IFFT sections 218-1 and 218-2.

DFT section 216 performs DFT processing on 12 time-series sets of received bundled ACK/NACK signals to obtain 12 signal components in the frequency-domain. DFT section 216 outputs the 12 signal components to spreading section 217.

Spreading section 217 spreads the 12 signal components received from DFT section 216 using a DFT sequence indicated by control section 208 and outputs the spread signal components to IFFT section 218-3.

IFFT sections 218-1, 218-2 and 218-3 perform IFFT processing on the received signals in association with the frequency positions where the signals are to be allocated, in accordance with an instruction from control section 208. Accordingly, the signals inputted to IFFT sections 218-1, 218-2 and 218-3 (i.e., ACK/NACK signals, the reference signals of A/N resource, the reference signals of bundled ACK/NACK resource and bundled ACK/NACK signals) are transformed into time-domain signals.

CP adding sections 219-1, 219-2 and 219-3 add the same signals as the last part of the signals obtained by IFFT processing to the beginning of the signals as a CP.

Time-multiplexing section 220 time-multiplexes the bundled ACK/NACK signals received from CP adding section 219-3 (i.e., signals transmitted using the data part of the bundled ACK/NACK resource) and the reference signals of the bundled ACK/NACK resource to be received from CP adding section 219-2 on the bundled ACK/NACK resource and outputs the multiplexed signals to selection section 221.

According to the instruction from control section 208, selection section 221 selects one of the bundled ACK/NACK resource received from time-multiplexing section 220 and the A/N resource received from CP adding section 219-1 and outputs the signals assigned to the selected resource to radio transmitting section 222.

Radio transmitting section 222 performs transmission processing such as D/A conversion, amplification and up-conversion on the signals received from selection section 221 and transmits the signals to base station 100 from the antenna.

[Method of Determining ePDCCH-PUCCH R Resources]

Next, the method of determining ePDCCH-PUCCH resources in base station 100 and terminal 200 configured as described above will be described.

Figure 11:
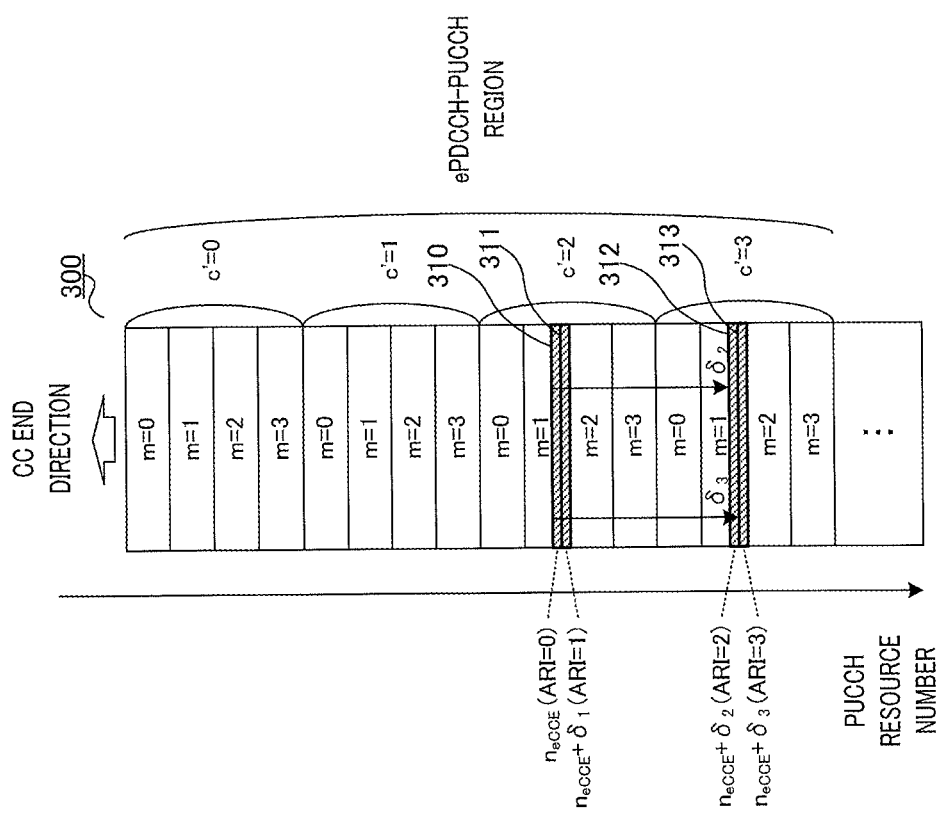
FIG. 11 is a diagram provided for describing a method of determining ePDCCH-PUCCH resources according to Embodiment 1 of the present invention.

FIG. 11 is a diagram provided for describing the method of determining ePDCCH-PUCCH resources according to the present embodiment. As shown in FIG. 11, ePDCCH-PUCCH resource region 300 is divided for each c' and each in and the resultant portions are arranged from the frequency end direction to center direction of the component carrier in ascending order of m and in ascending order of c'.

In the present embodiment, base station 100 sets offset values ($\delta_1$, $\delta_2$, $\delta_3$) for shifts made in a virtual PUCCH resource region corresponding to current DL subframe $m_{current}$.

Base station 100 first determines whether or not ePDCCH-PUCCH resource 310 with offset value 0, that is, by implicit signaling collides with a PDCCH-PUCCH resource. In the case of no collision, base station 100 indicates ARI=0 to terminal 200 so as to use ePDCCH-PUCCH resources 310. On the other hand, in the case of collision, base station 100 sequentially determines collision or no collision in ePDCCH-PUCCH resources 311, 312 and 313 to which other offset values are added and indicates ARI corresponding to non-colliding ePDCCH-PUCCH resources to terminal 200.

Terminal 200 obtains c' based on eCCE index $n_{eCCE}$ and offset value $\delta_{ARI}$ in a virtual PUCCH resource region corresponding to the indicated ARI and determines PUCCH resources to be used to indicate response signals indicating error detection results of downlink data from the PUCCH resource region corresponding to current DL subframe $m_{current}$.

[Effects]

Thus, according to the present embodiment, since a shift by an offset value indicated by ARI is made only within PUCCH resources associated with m=$m_{current}$, that is, the current DL subframe, no constraint is imposed on DL scheduling in future DL subframes.

Embodiment 2

In Embodiment 2, terminal 200 obtains c' based on eCCE index $n_{eCCE}$ and offset value $\delta_{ARI}$ corresponding to indicated ARI in a virtual PUCCH resource region which combines PUCCH resources corresponding to m=$_{current}$. Next, terminal 200 determines PUCCH resources to be used to indicate response signals indicating error detection results of downlink data in an ePDCCH-PUCCH resource region which is actually used.

Figure 12:
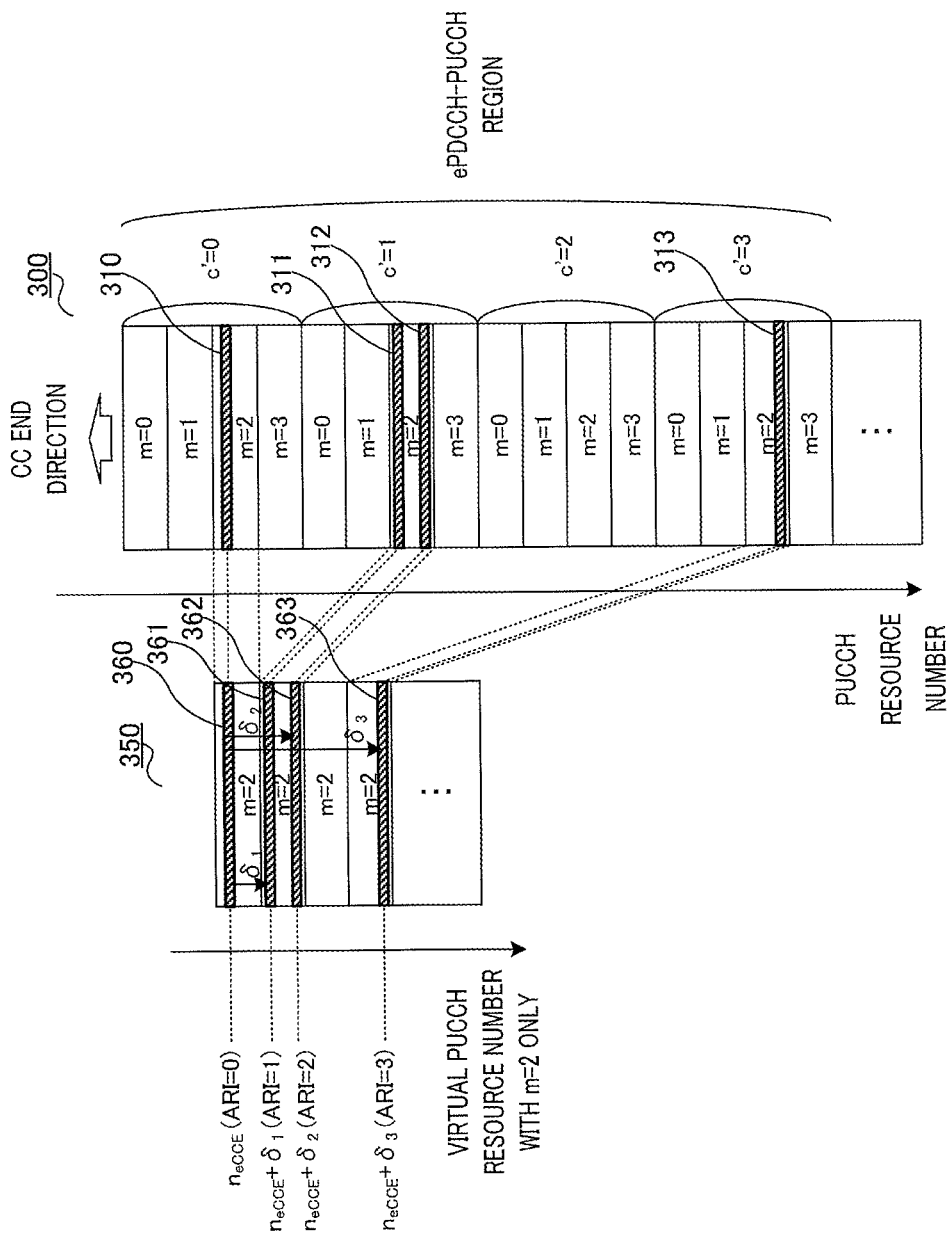
FIG. 12 is a diagram provided for describing a method of determining ePDCCH-PUCCH resources according to Embodiment 2 of the present invention.

FIG. 12 is a diagram provided for describing a method of determining ePDCCH-PUCCH resources according to the present embodiment. In the example in FIG. 12, suppose $m_{current}$=2. In FIG. 12, PUCCH resource region 350 is a virtual PUCCH resource region combining PUCCH resources with m=$m_{current}$=2. PUCCH resource region 350 is divided for each c' and resultant portions are arranged from the frequency end direction to center direction of a component carrier in ascending order of c'.

Base station 100 calculates c' to which $n_{eCCE}+\delta_{ARI}$ belongs in virtual PUCCH resource region 350 according to equation 6. Base station 100 determines one of PUCCH resources (360, 361, 362, 363) based on the calculated c' according to equation 7.

[6]

$$N_c \leq n_{eCCE} + \delta_{ARI} < N_{c'+1} \qquad \text{(Equation 6)}$$

[7]

$$n_{PUCCH,j}^{(1)} = (M-m-1)\cdot N_c + m\cdot N_{c'+1} + n_{eCCE,m} + \delta_{ARI} + N_{PUCCH}^{(1)''} \qquad \text{(Equation 7)}$$

In equation 6, c' need not always be the same value as c or within a range of the same value in PDCCH-PUCCH. In equation 7, $N^{(1)}_{PUCCH}{}'$ is an offset value corresponding to all ePDCCH-PUCCH resources previously set in terminal 200, but may also be a value different from offset value $N^{(1)}_{PUCCH}$ corresponding to all PDCCH-PUCCH resources.

As described above, in a special subframe in which the number of OFDM symbols used for the downlink is small, the size of an ePDCCH search space set is half the size of a normal subframe. Thus, while an offset value for a normal subframe is δ, an offset value for a special subframe may be δ/2.

[Effects]

Thus, according to the present embodiment, a shift by an offset value indicated by ARI is made in a virtual PUCCH resource region. Furthermore, for a virtual PUCCH resource, only a PUCCH resource associated with m=$m_{current}$, that is, a current DL subframe is used, and no constraint is imposed on DL scheduling in future DL subframes. Even an offset value of a small absolute value can indicate an ePDCCH-PUCCH resource corresponding to the same m and different c', and therefore when a positive offset value is given, it is possible to make a shift to an ePDCCH-PUCCH resource region having a lower probability of collision with PDCCH-PUCCH resources. Furthermore, these effects can be obtained even when the same offset value is set with different c' and m.

In FIG. 12, the virtual PUCCH resource region includes, except the ePDCCH-PUCCH resource region corresponding to m=2, resources outside the ePDCCH-PUCCH resource region (e.g., PUSCH region). The present embodiment may operate PUCCH resources shifted by an offset so as to be able to (1) indicate resources outside the ePDCCH-PUCCH resource region or (2) always indicate only resources inside the ePDCCH-PUCCH resource region.

Hereinafter, (1) a case where PUCCH resources are not limited to within the ePDCCH-PUCCH resource region and (2) a case where PUCCH resources are limited to within the ePDCCH-PUCCH resource region will be described.

(Variation 1)

Variation 1 is (1) a case where PUCCH resources are not limited to within the ePDCCH-PUCCH resource region.

Figure 13:
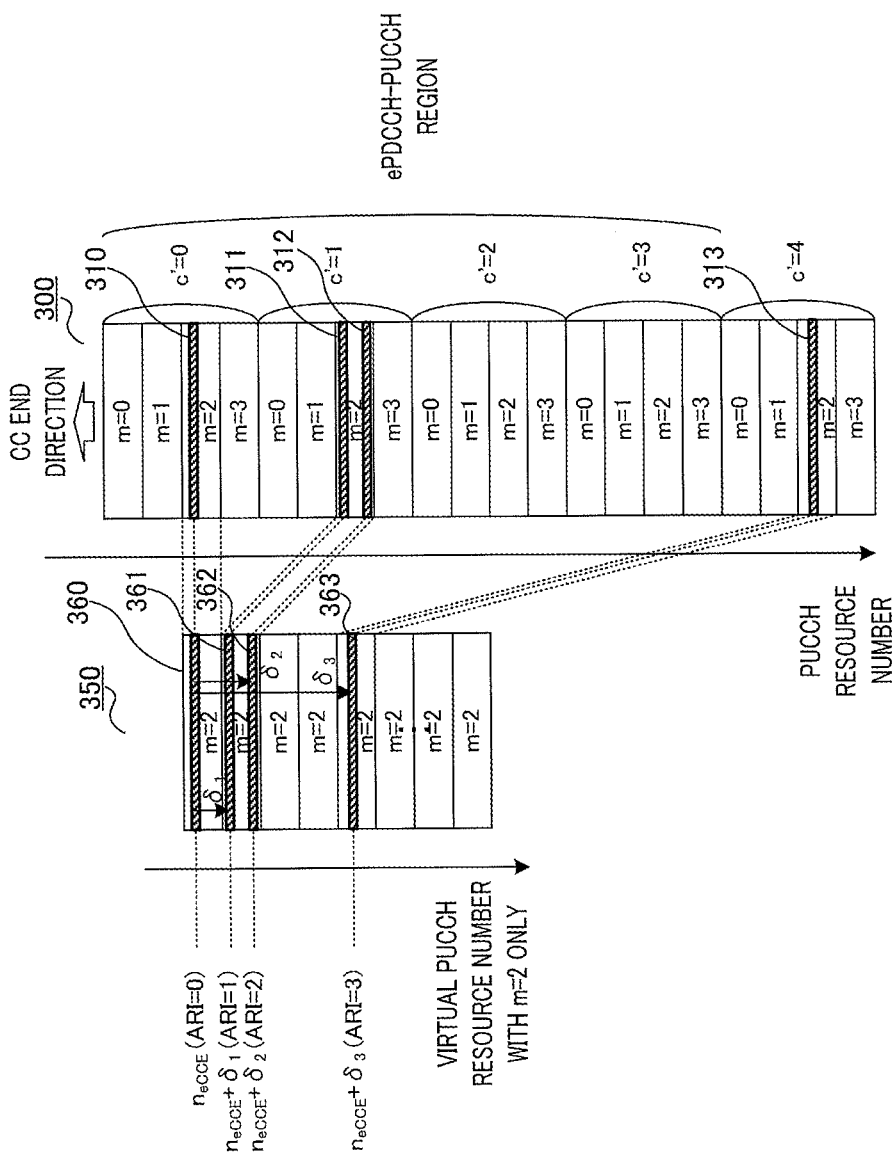
FIG. 13 is a first diagram provided for describing variation 1 according to Embodiment 2 of the present invention.
Figure 14:
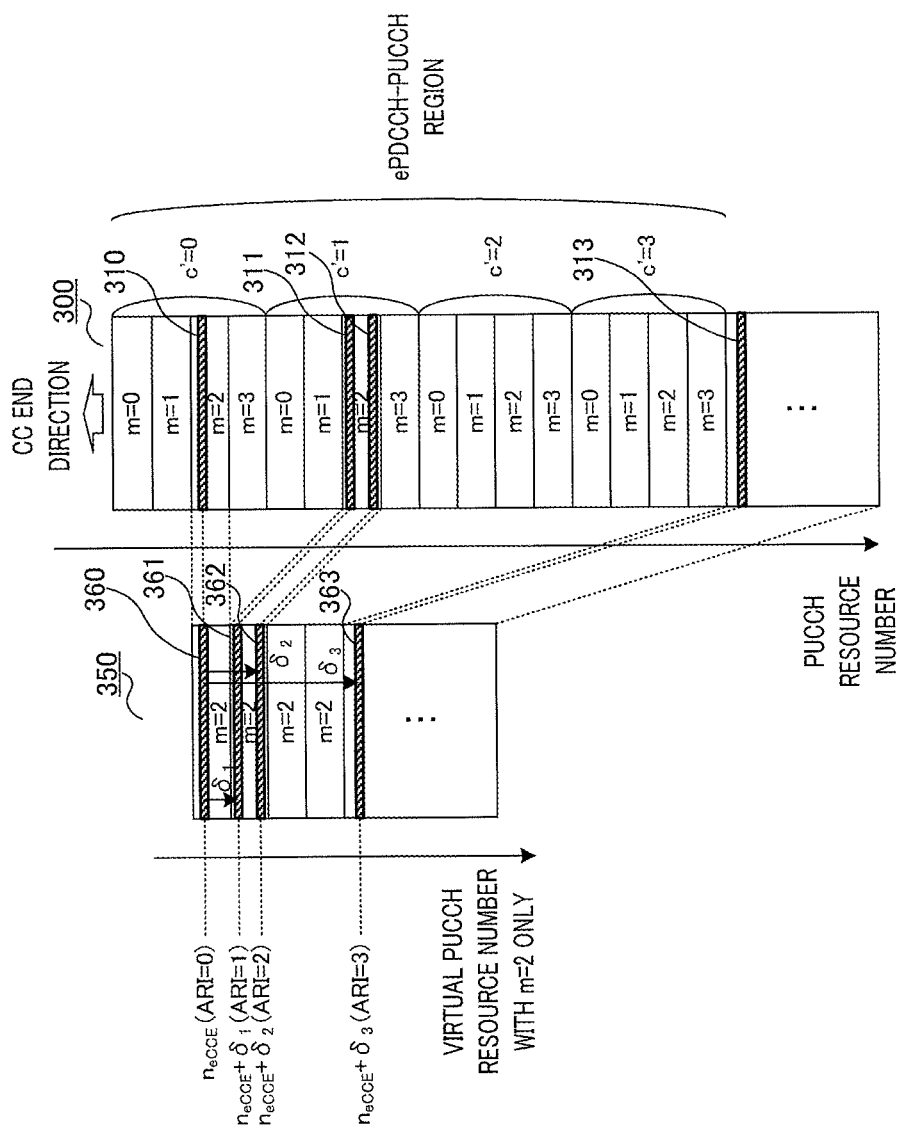
FIG. 14 is a second diagram provided for describing variation 1 according to Embodiment 2 of the present invention.

FIG. 13 and FIG. 14 illustrate an operation method when the virtual PUCCH resource region is not limited to within the ePDCCH-PUCCH resource region.

In the operation method shown in FIG. 13, resources outside the ePDCCH-PUCCH resource region are also divided for each c' and each in (that is, according to the same rule as that of ePDCCH-PUCCH) in actual ePDCCH-PUCCH resource region 300. In FIG. 13, an ePDCCH-PUCCH resource region is defined by c'=0, 1, 2, 3 and resources outside the ePDCCH-PUCCH resource region (e.g., PUSCH region) are defined by c'=4, . . . . In virtual PUCCH resource region 350, PUCCH resources are shifted based on offset values indicated by ARI in the ePDCCH-PUCCH resource region when m=$m_{current}$ and in the resource region outside the ePDCCH-PUCCH resource region. Note that equation 6 and equation 7 follow the present operation method.

On the other hand, in the operation method shown in FIG. 14, in actual ePDCCH-PUCCH resource region 300, resources outside the ePDCCH-PUCCH resource region are not divided for each c' and each m. In the virtual PUCCH resource region, resources outside the ePDCCH-PUCCH resource region in addition to the ePDCCH-PUCCH resource region when m=$m_{current}$ are added in the same way as in the actual resource region. In this resource region, PUCCH resources are shifted based on offset values indicated by ARI. In the present operation method, when c' that satisfies equation 6 is a maximum value of c' defined as the ePDCCH-PUCCH resource region (defined as $c'_{max}$) ($c'_{max}$=3 in the example of FIG. 14) or below, PUCCH resources are calculated according to equation 6 and equation 7, and when c' is greater than the maximum value of c' defined as the ePDCCH-PUCCH resource region, PUCCH resources are calculated according to equation 8.

[8]

$$n_{PUCCH,j}^{(1)} = (M-1)\cdot N_{c'_{max}+1} + (n_{eCCE,m} + \delta_{ARI} - N_{c'_{max}+1}) + N_{PUCCH}^{(1)''} \qquad \text{(Equation 8)}$$

In the operation method shown in FIG. 13 above, since the resource region outside the ePDCCH-PUCCH resource region is divided for each m, no collision of PUCCH resources indicated by ePDCCH occurs between different m's even outside the ePDCCH-PUCCH resource region. Therefore, this operation method is useful when the ePDCCH-PUCCH resource region is small, when the absolute value of an offset value is large or the like, that is, when many shift destinations by an offset go out of the ePDCCH-PUCCH resource region.

On the other hand, in the operation method shown in FIG. 14 above, the resource region outside the ePDCCH-PUCCH resource region is not divided for each m. For this reason, this operation method is useful when the ePDCCH-PUCCH resource region is large, when the absolute value of an offset value is small or the like, that is, when many shift destinations by an offset are included in the ePDCCH-PUCCH resource region.

(Variation 2)

Variation 2 corresponds to (2) a case where PUCCH resources are limited to within the ePDCCH-PUCCH resource region.

Figure 15:
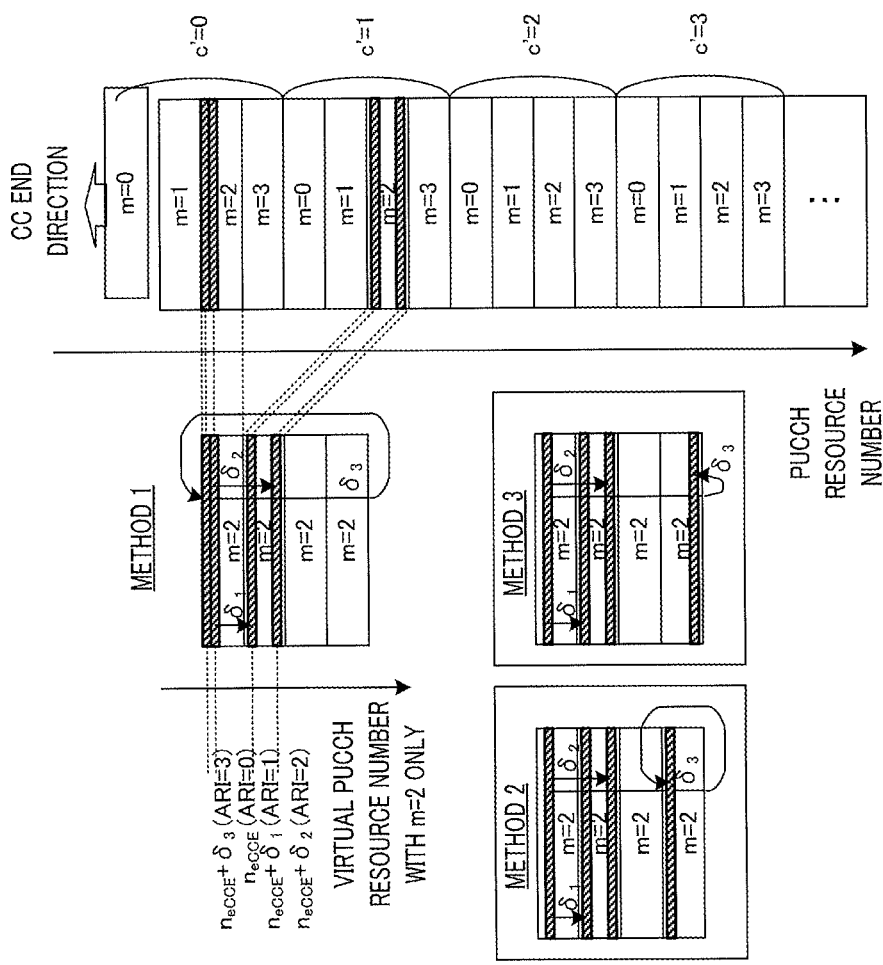
FIG. 15 is a diagram provided for describing variation 2 according to Embodiment 2 of the present invention.

FIG. 15 illustrates an operation method when PUCCH resources in a virtual PUCCH resource region are limited to within the ePDCCH-PUCCH resource region.

In the operation method (method 1) shown in FIG. 15, an ePDCCH-PUCCH resource region in the virtual PUCCH resource region when m=$m_{current}$ is rotated. In this rotating resource region, PUCCH resources are shifted based on an offset value indicated by ARI. In the present operation method, the entire virtual PUCCH resource region is rotated so that c' that satisfies equation 9 becomes a maximum value of c' or below, c' being defined as the ePDCCH-PUCCH resource region (defined as $c'_{max}$) ($c'_{max}$=3 in the example of FIG. 15). PUCCH resources are calculated from c' obtained according to equation 10.

[9]

$$N_c \leq (n_{eCCE} + \delta_{ARI}) \bmod N_{c'_{max}+1} < N_{c'+1} \qquad \text{(Equation 9)}$$

[10]

$$n_{PUCCH,j}^{(1)} = (M-m-1)\cdot N_c + m\cdot N_{c'+1} + (n_{eCCE,m} + \delta_{ARI}) \bmod N_{c'_{max}+1} + N_{PUCCH}^{(1)''} \qquad \text{(Equation 10)}$$

In method 1 shown in FIG. 15, c' having a high occupancy of PDCCH-PUCCH is returned to the ePDCCH-PUCCH resource region due to the rotation of the entire virtual PUCCH resource region (at the time of $\delta_3$ shift in FIG. 15). Since the ePDCCH-PUCCH resources which are shift destinations are more likely to have been occupied by PDCCH-PUCCH resources, there is a high possibility that the shift destinations may not be used. Thus, as shown in method 2 or method 3 shown in FIG. 15, a rotation or loopback method may be used so that greater c' is used preferentially. More specifically, according to method 2, rotation is made within the ePDCCH-PUCCH resource region corresponding to c' greater than a predetermined threshold (2<c' in FIG. 15). According to method 3, a loopback is made (a negative offset value is used) after a lowest end of the ePDCCH-PUCCH resource region corresponding to a maximum value of c' defined as the ePDCCH-PUCCH resource region (direction toward the center of the component carrier is defined as down).

(Variation 3)

Figure 16:
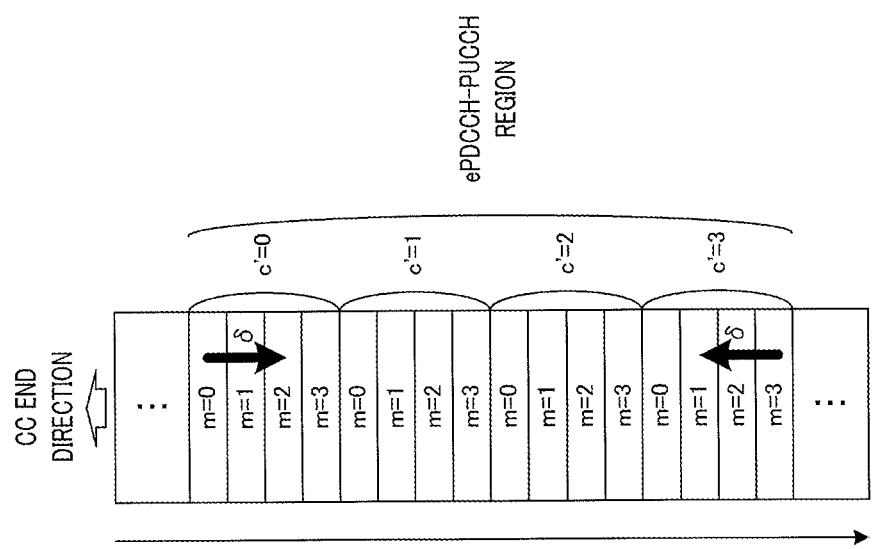
FIG. 16 is a diagram provided for describing variation 3 according to Embodiment 2 of the present invention.

The present embodiment has been described based on a positive offset value which is a direction in which c' and m increase as a premise, but the present invention is not limited to this, and a negative offset value may be used and PUCCH resources closer to the end of the component carrier may be used as well. For PUCCH, frequency hopping is performed symmetrically with respect to the center frequency of each component carrier for each slot, and therefore the possibility that resources outside the system band may be used increases by positively using a negative offset value, and a large frequency diversity effect is thereby obtained. However, the smaller the value of c', the higher the probability that ePDCCH-PUCCH resources will collide with PDCCH-PUCCH resources becomes. For that reason, for example, as shown in FIG. 16, an operation may be adopted such that collision is avoided using a positive offset for c' smaller than a predetermined threshold (e.g., 1.5) and a frequency diversity effect is increased using a negative offset for c' greater than the predetermined threshold. That is, in the present embodiment, the offset value can take any one of positive and negative values. The present embodiment does not limit all c' and m values to the same offset value.

(Variation 4)

Figure 17:
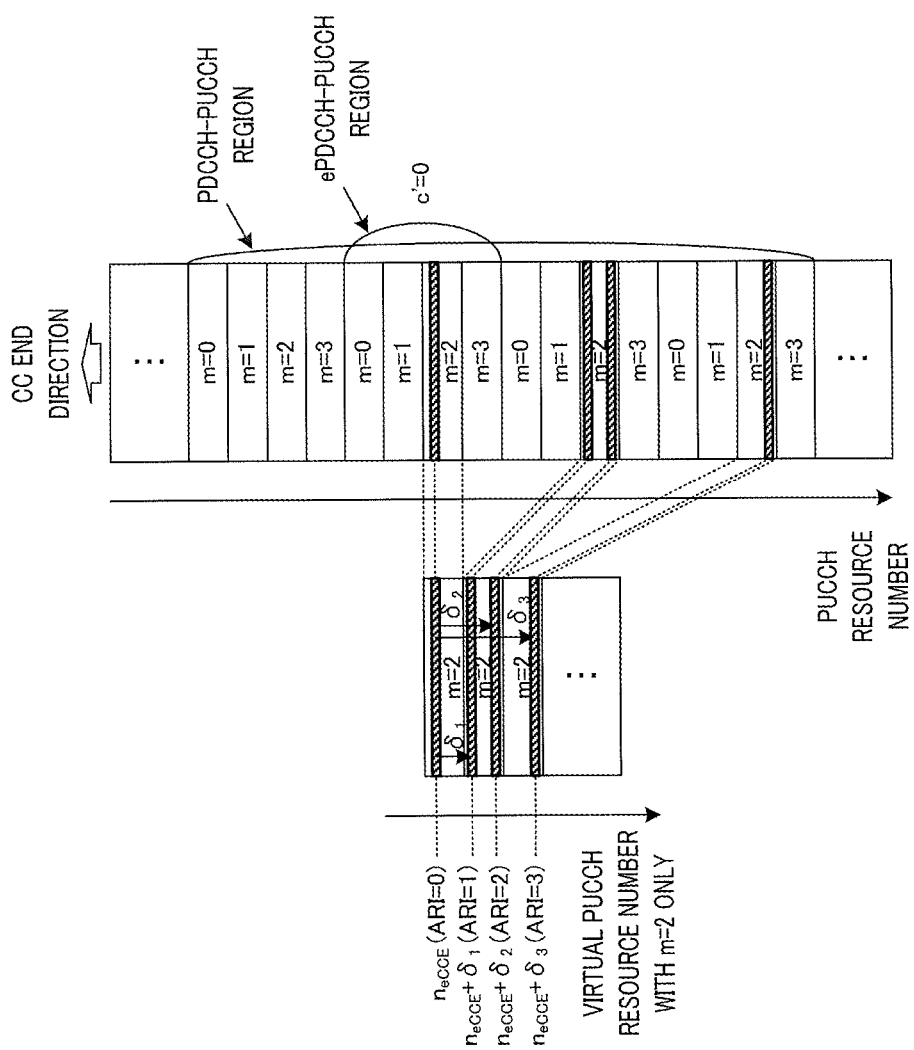
FIG. 17 is a first diagram provided for describing variation 4 according to Embodiment 2 of the present invention.
Figure 18:
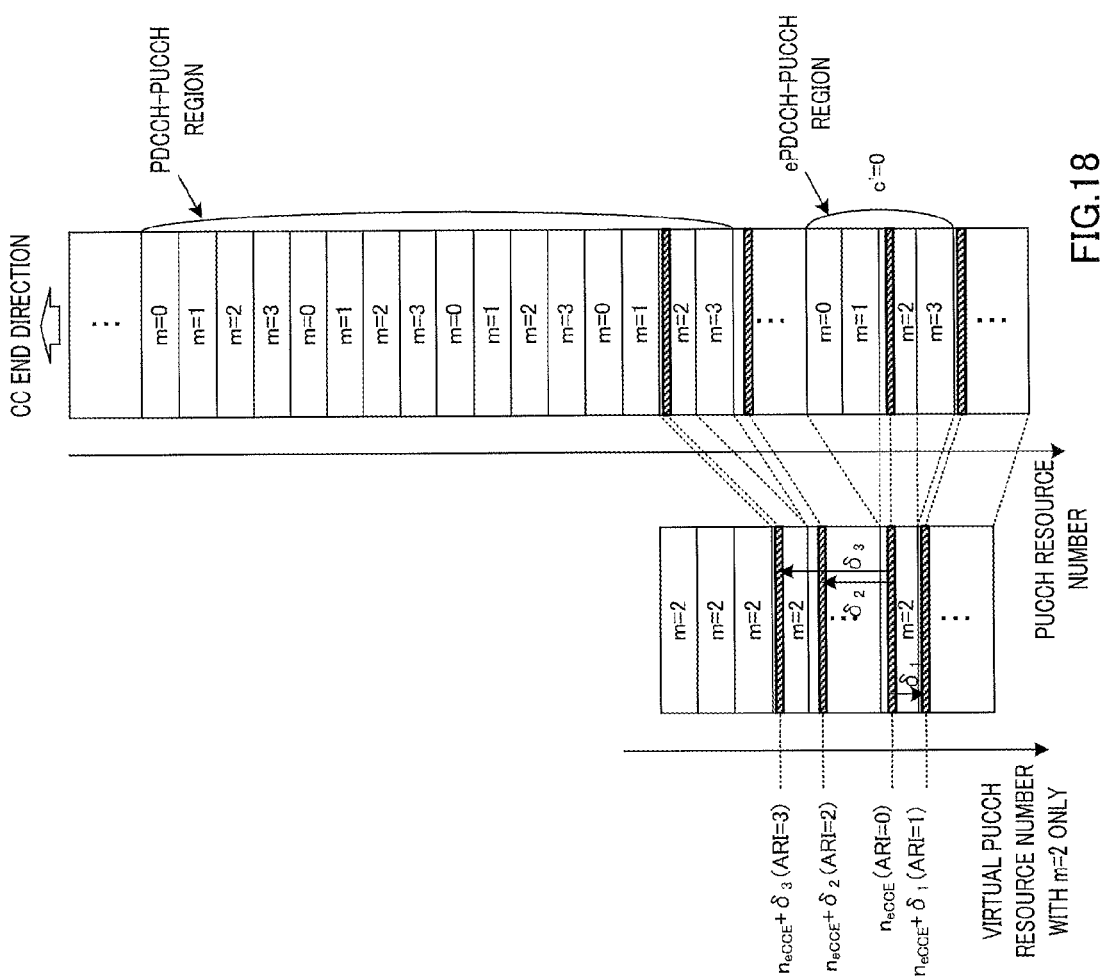
FIG. 18 is a second diagram provided for describing variation 4 according to Embodiment 2 of the present invention.

As described above, c' in ePDCCH-PUCCH resources need not always have the same value and the same range of values as those of PDCCH-PUCCH. FIG. 17 and FIG. 18 illustrate a case where the present embodiment is applied when c'={0}. FIG. 17 illustrates an example of a case where the ePDCCH-PUCCH resource region is shared with the PDCCH-PUCCH resource region corresponding to c=1. FIG. 18 illustrates an example of a case where the ePDCCH-PUCCH resource region is not shared with the PDCCH-PUCCH resource region.

As shown in FIG. 17, when the ePDCCH-PUCCH resource region is shared with the PDCCH-PUCCH resource region, the scale of the PUCCH resource region for each c and each m is equalized to the scale of the PUCCH resource region for each c' and each in between the shared PDCCH-PUCCH resource region (c=1) and ePDCCH-PUCCH resource region (c'=0). That is, in FIG. 17, the PDCCH-PUCCH resource region for each m when c=1 and the ePDCCH-PUCCH resource region for each m when c'=0 have the same scale. By this means, since PDCCH-PUCCH and ePDCCH-PUCCH can use a PUCCH region corresponding to the same m with an actual PUCCH resource number, the one control channel (PDCCH or ePDCCH) in a current DL subframe will not impose constraints on scheduling of the other control channel (ePDCCH or PDCCH) in future DL subframes.

As described above, the scale of the PDCCH region is defined by CFI (Control Format Indicator). Therefore, the maximum value that c indicating the scale of the PDCCH-PUCCH resource region can take depends on the magnitude of CFI.

CFI is intended to indicate the scale of the PDCCH region. Therefore, if the OFDM symbol from which assignment of ePDCCH (and PDSCH) is started is assigned from a fixed OFDM symbol (or OFDM symbol preset by base station 100) independent of the scale of the PDCCH region, terminal 200 that receives ePDCCH but does not receive PDCCH need not receive CFI. That is, terminal 200 that receives ePDCCH but does not receive PDCCH may be operated assuming that without receiving CFI, for example, CFI=3 (that is, the PDCCH region occupies the first to third OFDM symbols) is fixedly set and assignment of ePDCCH starts from the fourth OFDM symbol. However, in this case, terminal 200 does not know the scale of the actual PDCCH region. Thus, terminal 200 does not know the maximum value that c can take either. In such a case, terminal 200 may calculate the maximum value that c can take assuming CFI=3 which is the value assumed above. Base station 100 may preset the maximum value that c can take or information pursuant thereto (e.g., CFI value) in terminal 200.

As shown in FIG. 18, when not shared with the PDCCH-PUCCH resource region, the design of the ePDCCH-PUCCH resource region is not constrained by the design of the PDCCH-PUCCH resource region. For that reason, the method of calculating the scale of the ePDCCH-PUCCH resource region for each c' and each m is not constrained by the method ($N_{c+1}-N_c$) of calculating the scale of the PDCCH-PUCCH resource region for each c and each m. The present embodiment may adopt an operation such that the ePDCCH-PUCCH resource region overlaps with the PDCCH-PUCCH resource region (e.g., $\delta_3$ in FIG. 18) by a shift based on the offset value indicated by ARI. Alternatively, the present embodiment may also adopt an operation such that the resources are arranged outside the PDCCH-PUCCH resource region and outside the ePDCCH-PUCCH resource region (e.g., $\delta_1$ and $\delta_2$ in FIG. 18). If an operation is positively adopted such that the ePDCCH-PUCCH resource region overlaps with the PDCCH-PUCCH resource region, it is possible to reduce the overhead of total PUCCH resources.

(Variation 5)

A case has been described in the present embodiment where an eCCE index is used as an implicit parameter, but the present invention is not limited to this. In addition to the eCCE index, the implicit parameter may also be an index of resource element group (REG) eREG in the ePDCCH region, PRB (Physical Resource Block) number of PDSCH or antenna port number with which ePDCCH is indicated. A plurality of ePDCCH search space sets may be defined, and which search space set is used to indicate ePDCCH can also be said to be an implicit parameter. Some of these parameters or a combination of these parameters are also implicit parameters. In short, when DL assignment and PDSCH are assigned to terminal 200, the implicit parameter can be any parameter that is at least implicitly determined.

(Variation 6)

Figure 19:
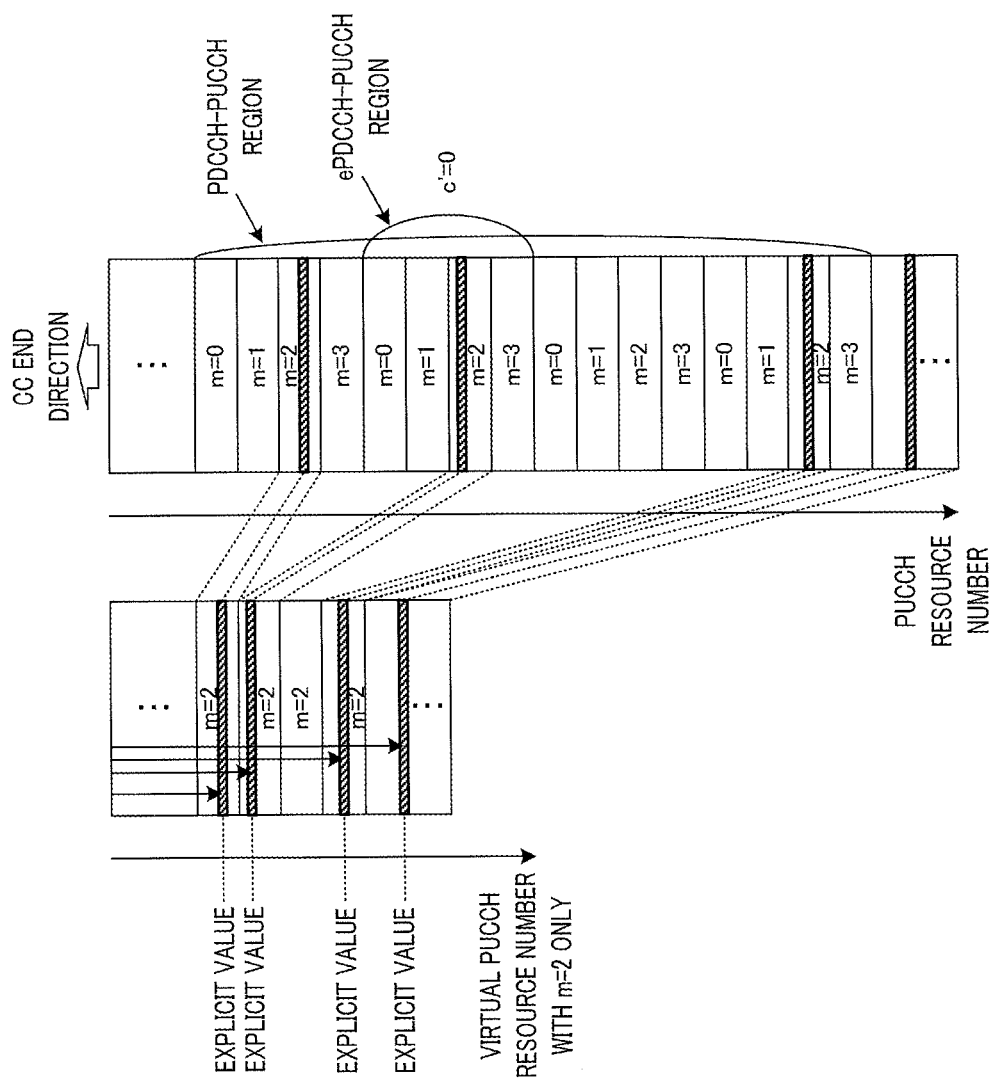
FIG. 19 is a diagram provided for describing variation 6 according to Embodiment 2 of the present invention.

Furthermore, the present invention is not necessarily applied to only the method of indicating PUCCH resources based on an implicit parameter and an offset value (relative value) from the implicit parameter indicated by ARI, and as shown in FIG. 19, terminal 200 may also obtain c' based on an "explicit resource (absolute value) in a virtual PUCCH resource region" indicated by ARI in the virtual PUCCH resource region corresponding to m=m$_{current}$ and then identify a PUCCH resource in the actual PUCCH resource region. In this case, as shown in FIG. 19, even when the explicit resources (absolute values) in the virtual PUCCH resource region are the same between different m's, those fitting to each m are used in the actual PUCCH resource region. Note that the "explicit resource (absolute value) in the virtual PUCCH resource region" may also be expressed as an "offset value (absolute value) from a fixed position (e.g., frequency end of a component carrier) in the virtual PUCCH resource region."

That is, when ARI indicates the "explicit resource (absolute value) in the virtual PUCCH resource region," an ePDCCH-PUCCH resource corresponding to m=m$_{current}$ is indicated within the PDCCH-PUCCH resource region or within the ePDCCH-PUCCH resource region, which will impose no scheduling constraint in future DL subframes.

(Variation 7)

A shift by an offset value is made in the virtual PUCCH resource region in the above description, and the following description will show that a shift by an offset can be realized without imposing any constraint on DL scheduling in future DL subframes by imposing constraints on the method of dividing the PUCCH resource region for each c' and each m, and an offset value. However, the following is not intended to avoid collision between PDCCH-PUCCH resources and ePDCCH-PUCCH resources but collision between ePDCCH-PUCCH resources.

According to the present variation, base station 100 sets different ePDCCH search space sets between terminals. In this case, the scale (N in FIG. 23) of the PUCCH resource region for each c' and each m is set to a fixed value irrespective of the ePDCCH search space. However, in special subframes in which the number of OFDM symbols used for the downlink is small, the scale of the PUCCH resource region for each c' and each m may be set to N/2. According to FIG. 23, suppose ePDCCH search space set A having a scale of N$_{eCCE}$(=N) and ePDCCH search space set B having a scale of N$_{eCCE}'$ (=2N) are set, and leading eCCE indices n$_{eCCE}$ and n$_{eCCE}'$ to which DL assignment is assigned in the respective ePDCCH search spaces indicate the same PUCCH resource. In this case, since collision between PUCCH resources occurs, it is possible to avoid collision by adding an offset having at least a scale of N$_{eCCE}$ or N$_{eCCE}'$ or more of the ePDCCH search space set to the one PUCCH resource. However, it is not desirable to impose scheduling constraints in future DL subframes as described above.

Figure 24:
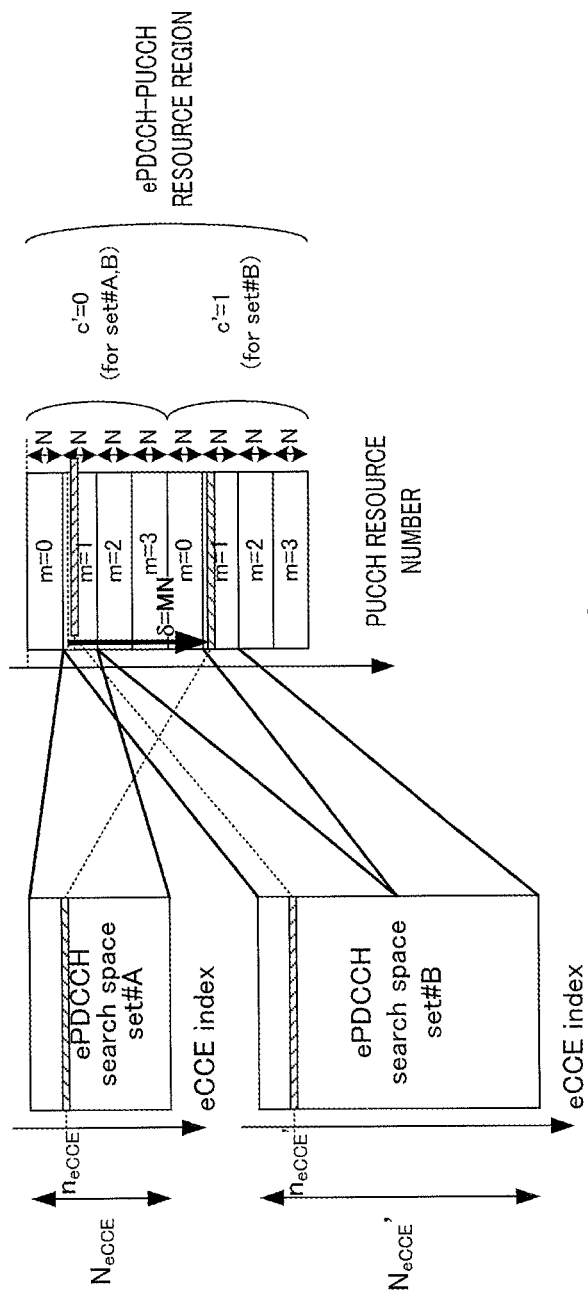
FIG. 24 is a second diagram provided for describing variation 7 according to Embodiment 2 of the present invention.

Thus, in the present variation, as shown in FIG. 24, offset value S is assumed to be MN for ePDCCH search space set A having a scale of N$_{eCCE}$=N in a physical PUCCH resource region. Here, N is the scale of a PUCCH resource region for each c' and each in common among different search space sets. By setting scale N of the PUCCH resource region for each c' and each m to a fixed value irrespective of the ePDCCH search space, it is possible to avoid collision between ePDCCH-PUCCH resources also in the physical PUCCH resource region without imposing constraints on future scheduling.

Figure 23:
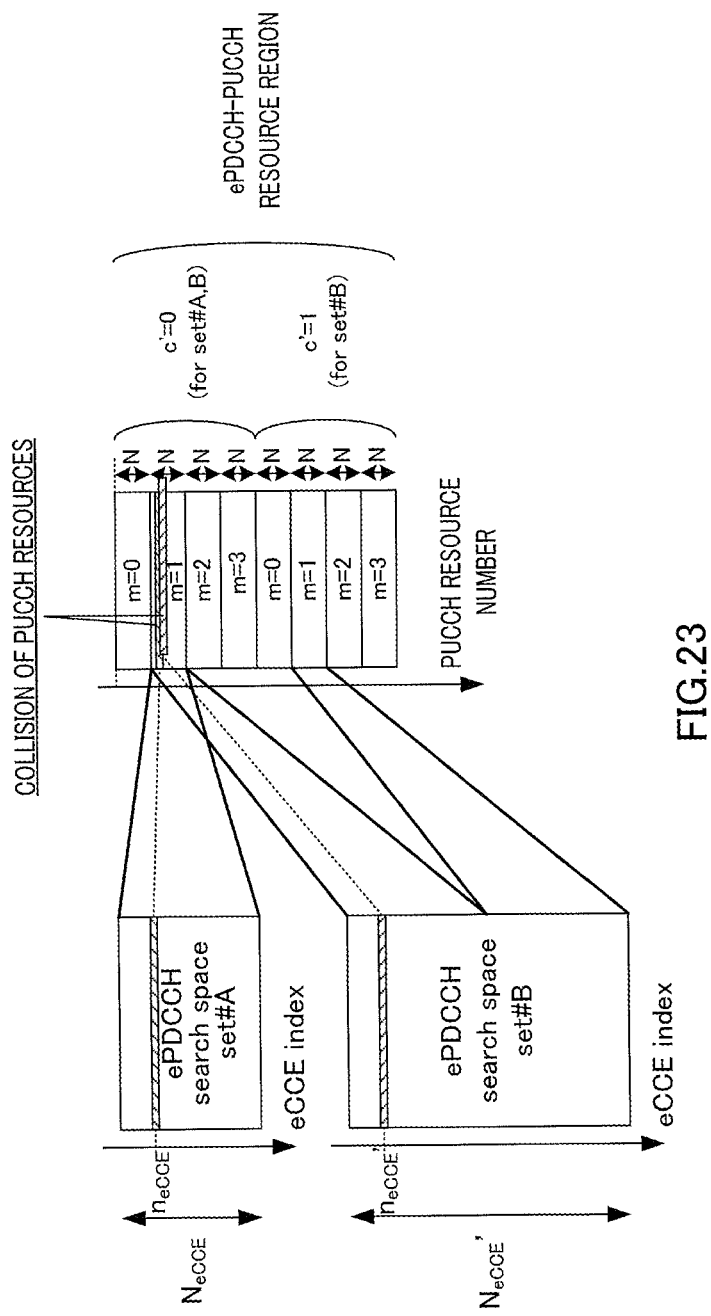
FIG. 23 is a first diagram provided for describing variation 7 according to Embodiment 2 of the present invention.
Figure 25:
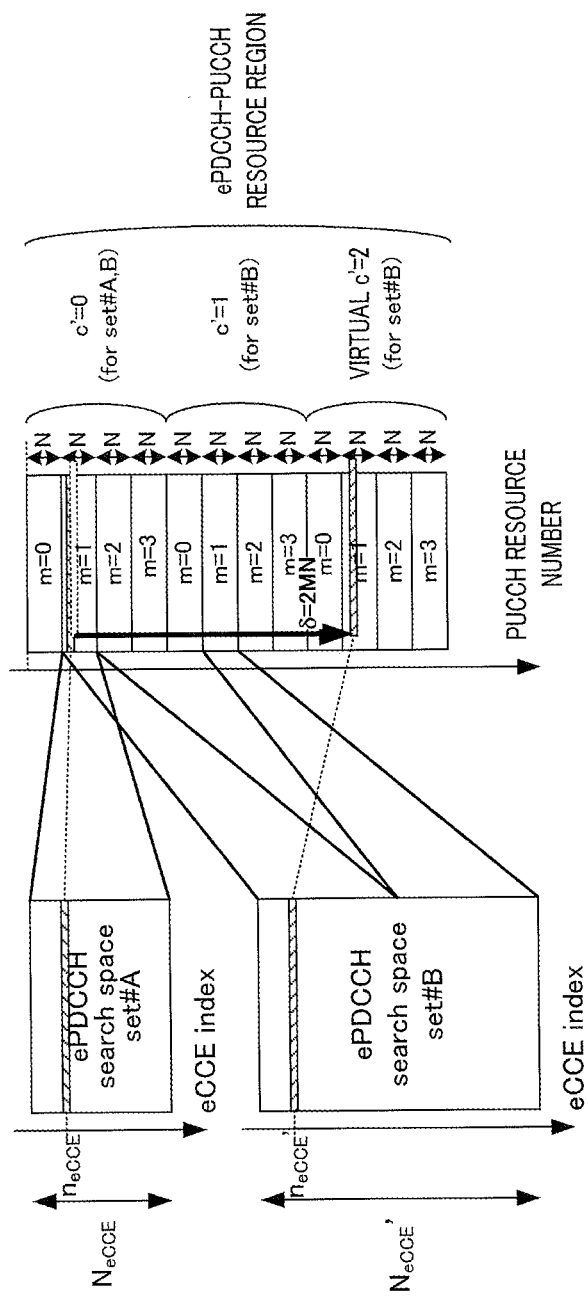
FIG. 25 is a third diagram provided for describing variation 7 according to Embodiment 2 of the present invention.

In order to avoid collision between PUCCH resources in FIG. 23, terminal 200 having ePDCCH search space set B of N$_{eCCE}'$=2N in scale as shown in FIG. 25 may make a shift by an offset. In this case, offset value δ is assumed to be 2MN. This can avoid collision between ePDCCH-PUCCH resources without imposing constraints on future scheduling.

In the example of FIG. 25, although it is possible to avoid collision of PUCCH resources by setting offset value δ to MN, a shift by offset value δ=MN may be made by another terminal having ePDCCH search space set A of N$_{eCCE}$=N in scale. Therefore, the shift by offset may be determined based on the scale of the ePDCCH search space whereby DL assignment intended for the terminal is indicated. An example of N$_{eCCE}$=N and N$_{eCCE}'$=2N has been shown above, and generally, the value of offset δ may be MN in a range of N$_{eCCE}$≤N and the value of offset δ may be 2MN in a range of N<N$_{eCCE}$≤2N. When these are expressed in a generalized manner, offset value δ (δ$_{ARI}$) may be set as shown in equation 11. Here, N$_{eCCE}$ represents the scale of the ePDCCH search space set whereby DL assignment is indicated in terminal 200 that makes a shift by offset. M represents a bundling window.

[11]

$$\delta_{ARI}=\lceil N_{eCCE}/N\rceil\cdot M\cdot N \qquad\text{(Equation 11)}$$

As described above, the scale of the ePDCCH search space set in a special subframe in which the number of OFDM symbols used for the downlink is small is half the scale of a normal subframe. Thus, while scale N$_{Normal}$ of the PUCCH resource region for each c' and each m for a normal subframe is set to N, scale N$_{Special}$ of the PUCCH resource region for each c' and each m for a special subframe may be set to N/2. At this time, the offset value in FIG. 23 according to the description of the present variation is (3+½)N when bundling window M includes a special subframe in which the number of OFDM symbols used for the downlink is small and is 4N when bundling window M does not include any special subframe in which the number of OFDM symbols used for the downlink is small. The offset value in FIG. 24 is 2×(3+½)N when bundling window M includes a special subframe in which the number of OFDM symbols used for the downlink is small and is 2×4N when bundling window M does not include any special subframe in which the number of OFDM symbols used for the downlink is small. That is, the offset value at this time is as shown in equation 12 when bundling window M includes a special subframe in which the number of OFDM symbols used for the downlink is small and as shown in equation 13 when bundling window M does not include any special subframe in which the number of OFDM symbols used for the downlink is small.

[12]

$$\delta_{ARI}=\lceil N_{eCCE,m}/N\rceil\cdot((M-1)\cdot N_{Normal}+N_{Special}) \qquad\text{(Equation 12)}$$

[13]

$$\delta_{ARI}=\lceil N_{eCCE,m}/N\rceil\cdot M\cdot N_{Normal} \qquad\text{(Equation 13)}$$

Although the present invention relates to TDD, if the present invention is applied to FDD, M=1 is assumed and the PUCCH resource region for each c' and each m need not be considered, and therefore N need not be considered. That is, offset value δ (δ$_{ARI}$) is the scale of the ePDCCH search space set to which DL assignment intended for the terminal is assigned in terminal 200 as shown in equation 14.

[14]

$$\delta_{ARI}=N_{eCCE} \qquad\text{(Equation 14)}$$

Since the scale of the ePDCCH search space set is an even number irrespective of FDD or TDD and the aggregation level of ePDCCH is an even number except 1, PUCCH resources corresponding to even-numbered eCCE indices are likely to be occupied.

Based on this, when the offset value shown in equation 11 and equation 14 is an even number, an offset value obtained by adding +1 or −1 to the offset value may be used.

Based on the above description, the method of determining PUCCH resources according to the present variation will be described using equations.

Terminal 200 calculates c' to which leading eCCE index $n_{eCCE}$ belongs according to equation 15, DL assignment intended for the terminal being assigned to leading eCCE index $n_{eCCE}$. Terminal 200 determines PUCCH resources according to equation 16 based on the calculated c'.

[15]

$$c' \cdot N \leq n_{eCCE} < (c'+1) \cdot N \quad \text{(Equation 15)}$$

[16]

$$n_{PUCCH,j}^{(1)} = (M-m-1) \cdot c'N + m \cdot (c'+1)N + n_{eCCE,m} + N_{PUCCH}^{(1)'} \quad \text{(Equation 16)}$$

$N^{(1)}_{PUCCH}{}'$ is an offset value preset in terminal 200 for all ePDCCH-PUCCH resources and may also take a value which varies from one ePDCCH search space set to another.

When a PUCCH resource determined according to equation 16 collides with a PUCCH resource used by another terminal, base station 100 may instruct terminal 200 to make a shift of the PUCCH resource by dynamic offset $\delta_{ARI}$ using ARI indicated by DL assignment intended for terminal 200. At this time, terminal 200 determines a PUCCH resource after the shift using equation 17. The value of c' in equation 17 is the same as the value of equation 16. The value of $\delta_{ARI}$ in equation 17 is determined according to equation 11.

[17]

$$n_{PUCCH,j}^{(1)} = (M-m-1) \cdot c'N + m \cdot (c'+1)N + n_{eCCE,m} + \delta_{ARI} + N_{PUCCH}^{(1)'} \quad \text{(Equation 17)}$$

[Effect by Setting N to Fixed Value]

Figure 26:
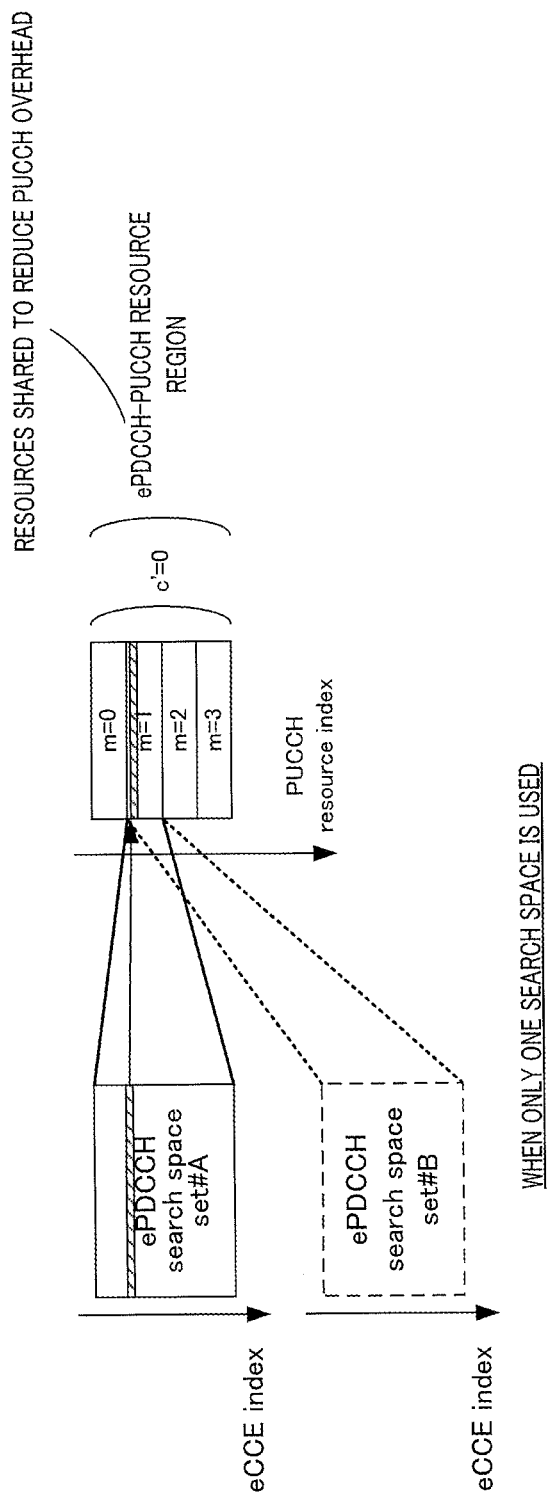
FIG. 26 is a first diagram provided for describing a method of dividing a PUCCH resource region of variation 7 according to Embodiment 2 of the present invention.

Here, the effect of setting scale N of the PUCCH resource region for each c' and each m to a fixed value irrespective of the ePDCCH search space will be described with reference to FIG. 26, FIG. 27 and FIG. 28.

When base station 100 sets different ePDCCH search space sets (set A and set B) between terminals, the following two methods can be considered as operation methods available to base station 100.
(1) Scheduled to only one ePDCCH search space set
(2) Simultaneously scheduled (in the same subframe) to both ePDCCH search space sets
(1) When scheduled to only one ePDCCH search space set, PUCCH resources as shown in FIG. 26 are shared to reduce the overhead of PUCCH resources corresponding to each ePDCCH search space set. Here, FIG. 26 illustrates indication of assignment of downlink data by ePDCCH and a corresponding PUCCH resource in subframe #5 of UL-DL Configuration#2 shown in FIG. 3. In FIG. 26, only ePDCCH search space set A is scheduled. Although the same PUCCH resource region as that of ePDCCH search space set A is associated with ePDCCH search space set B, no collision of PUCCH resources occurs between both sets because ePDCCH search space set B is not scheduled.

On the other hand, (2) when both ePDCCH search space sets are simultaneously scheduled, collision of PUCCH resources occurs between both sets, and it is therefore preferable not to share the PUCCH resource region.

Here, a case will be considered where the base station performs operation by dynamically switching between the two operation methods above, that is, (1) only one ePDCCH search space set is scheduled and (2) both ePDCCH search space sets are simultaneously (in the same subframe) scheduled. At this time, when PUCCH resources are shared between the sets, overhead of the PUCCH resources can be reduced, but on the other hand, collision of PUCCH resources occurs between the sets. In order to avoid collision, an offset value greater than the scale of the ePDCCH search space set needs to be used, and the value is 4, 8, 16, 32 or the like as described above, that is, greater than 1.

For this reason, even when different ePDCCH search space sets are set between the terminals, the possibility that the offset destination PUCCH resource will become $m > m_{current}$ when m corresponding to a DL subframe at certain timing is assumed to be $m_{current}$ becomes higher than the case with "+1" which is the offset value applied in the PDCCH-PUCCH resource region. Therefore, when downlink data assignment is indicated by ePDCCH, constraints are imposed on scheduling for future DL subframes. The constraints become bigger as the value of m increases. Therefore, the base station is more likely not to be able to assign control information to an optimum terminal. Moreover, the base station requires scheduling taking into account a relationship between subframes and the base station scheduler becomes more complicated.

As described above, the base station may set different ePDCCH search space sets between terminals and these ePDCCH search space sets may be different in scale. In addition, the base station can set different start positions $N^{(1)}_{PUCCH}$ of PUCCH resources for the respective ePDCCH search space sets. FIG. 27 illustrates PUCCH resources when the scale of ePDCCH search space set A is $N_{eCCE}$, the corresponding start position of the PUCCH resource is $N^{(1)}_{PUCCH}$, the scale of ePDCCH search space set B is $N_{eCCE}'(\neq N_{eCCE})$ and the corresponding start position of the PUCCH resource is $N^{(1)}_{PUCCH}{}'$. Here, in FIG. 27, PUCCH resources for ePDCCH are calculated based on equation 1, equation 2 and equation 3 as in the case of PUCCH resources for PDCCH. Scales $N_{1-0}$, $N_{2-1}$ and $N_{3-2}$ of the PUCCH resource region for each c and each m are calculated by $N_1-N_0$, $N_2-N_1$ and $N_3-N_2$ using equation 2 and these scales take different values. That is, the scale of the PUCCH resource region for each c and each m varies for each c. As shown in FIG. 27, when start position $N^{(1)}_{PUCCH}$ of PUCCH of ePDCCH search space set A coincides with the start of c=1 of the PUCCH resource of ePDCCH search space set B, the PUCCH resource corresponding to m=0 of ePDCCH search space set A coincides with the PUCCH resource corresponding to m=0 of ePDCCH search space set B, but the leading part of the PUCCH resource corresponding to m=1 of ePDCCH search space set A coincides with the PUCCH resource corresponding to m=0 of ePDCCH search space set B (shaded part (A) in FIG. 27). At this time, when m=0 of ePDCCH search space set B, if the PUCCH resource of shaded part (A) in FIG. 27 is used, ePDCCH search space set A cannot use the PUCCH resource when m=1 which is a future subframe for m=0. The same applies to shaded parts (B) and (C) in FIG. 27. Therefore, when the scale of the ePDCCH search space and the start position of a PUCCH corresponding to the ePDCCH search space are different among a plurality of ePDCCH search spaces, constraints are also imposed on scheduling for future DL subframes.

Figure 27:
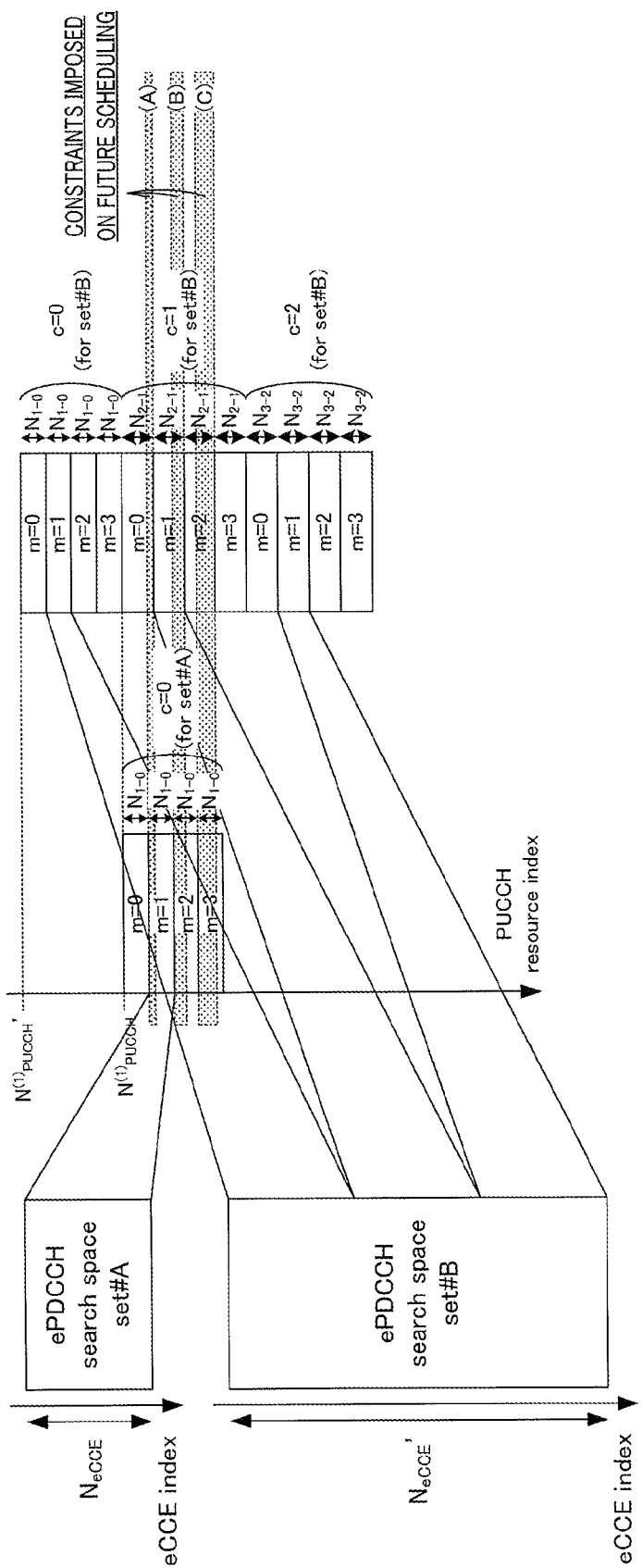
FIG. 27 is a second diagram provided for describing a method of dividing a PUCCH resource region of variation 7 according to Embodiment 2 of the present invention.
Figure 28:
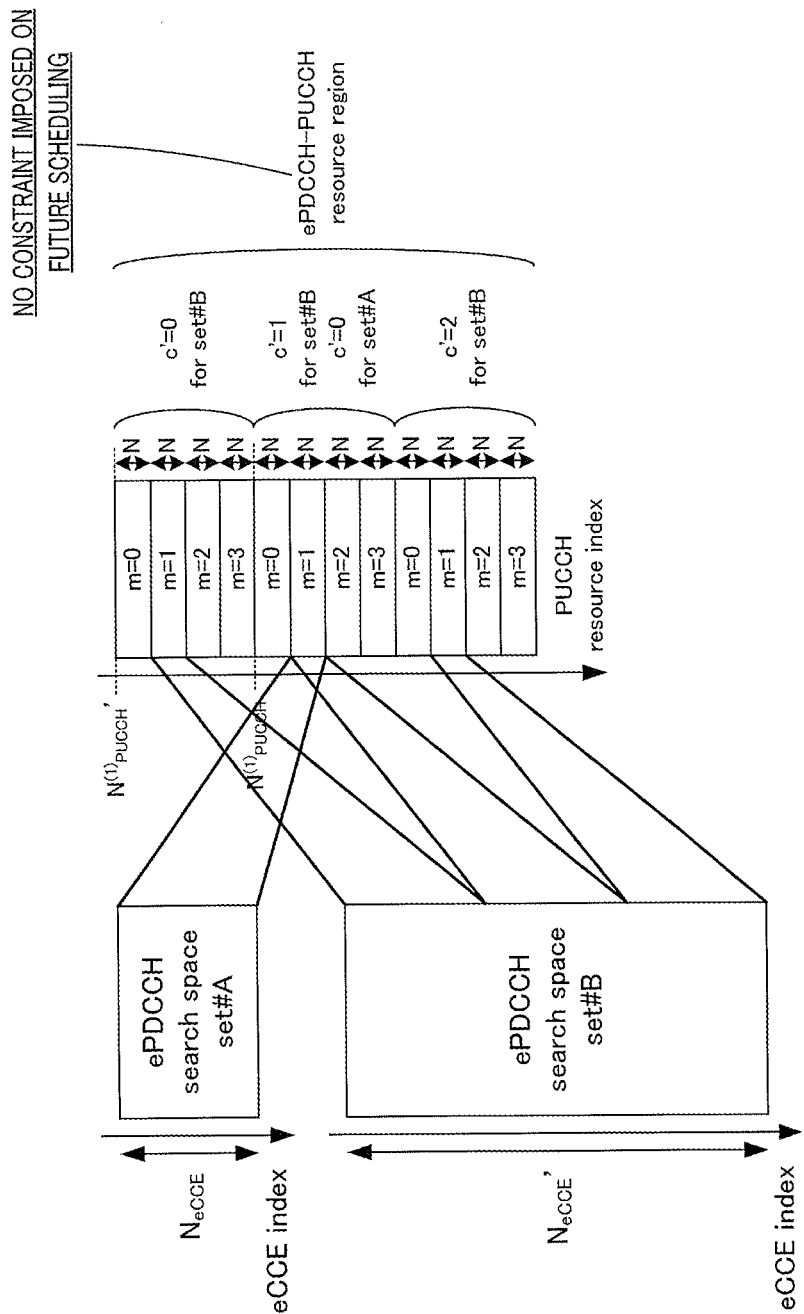
FIG. 28 is a third diagram provided for describing a method of dividing a PUCCH resource region of variation 7 according to Embodiment 2 of the present invention.

Thus, as shown in FIG. 28, by dividing the PUCCH regions for ePDCCH search space set A and ePDCCH search space set B by the same scale N respectively, the same value of m is always associated by PUCCH resources between the sets, and it is thereby possible to avoid constraints on future scheduling due to the difference in scale of the ePDCCH search space as shown in FIG. 27.

The effect of setting scale N of the PUCCH resource region for each c' and each m to a fixed value irrespective of the ePDCCH search space has been described so far.

[Value of N]

N according to the present variation needs only to have a common scale when a PUCCH resource region is shared among a plurality of ePDCCH search space sets, and a more specific example of the setting method of N is shown below though this does not necessarily limit the value or range of values thereof. Note that when the PUCCH resource region is shared among a plurality of ePDCCH search space sets, the value of N needs to have a scale common among the plurality of ePDCCH search space sets as described above, but if the PUCCH resource region is not shared among the plurality of ePDCCH search space sets, the value of N may have a scale common among a plurality of ePDCCH search space sets or the value of N may have a different scale.

(Method 1)

Figure 29:
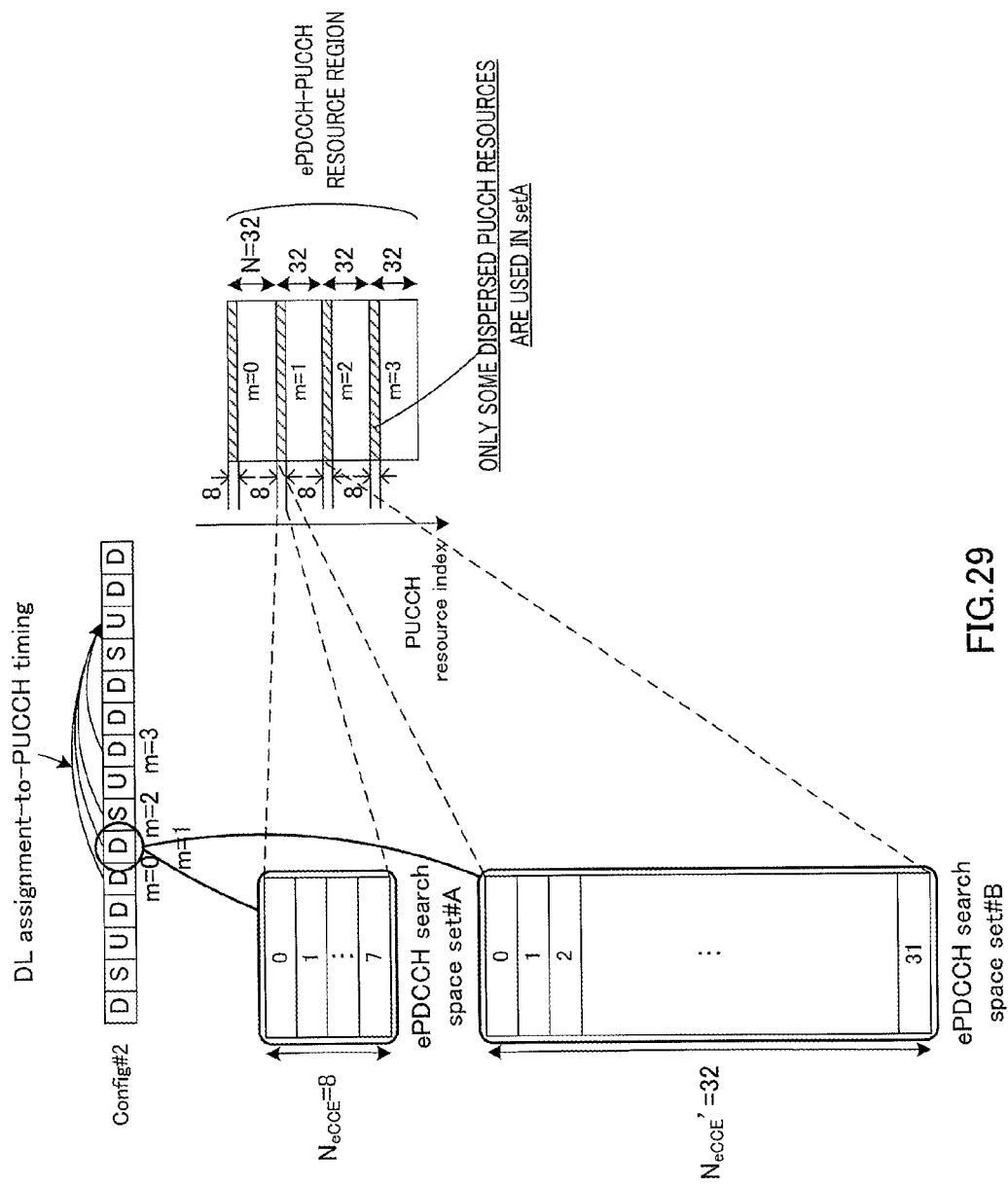
FIG. 29 is a first diagram provided for describing a size of dividing a PUCCH resource region of variation 7 according to Embodiment 2 of the present invention.

FIG. 29 illustrates a specific example of a case where a PUCCH resource region is shared among a plurality of ePDCCH search space sets, $N_{eCCE}=8$ as the scale of ePDCCH search space set A, $N_{eCCE}=32$ as the scale of ePDCCH search space set B and N=32 as the scale of N. When the PUCCH resource region is assigned to only ePDCCH search space set A, corresponding PUCCH resources are 8 PUCCH resources (shaded parts in FIG. 29) of each PUCCH resource region for each m and each c' of N=32 and the remaining 24 resources are not used as the PUCCH resources corresponding to search space set A. Since PUCCH resources used are dispersed within the PUCCH resource region, when the PUCCH resource region is shared among a plurality of ePDCCH search space sets, if the PUCCH resource region is assigned to only ePDCCH search space set A, it is obvious that setting N=32 causes overhead of PUCCH to increase.

Figure 30:
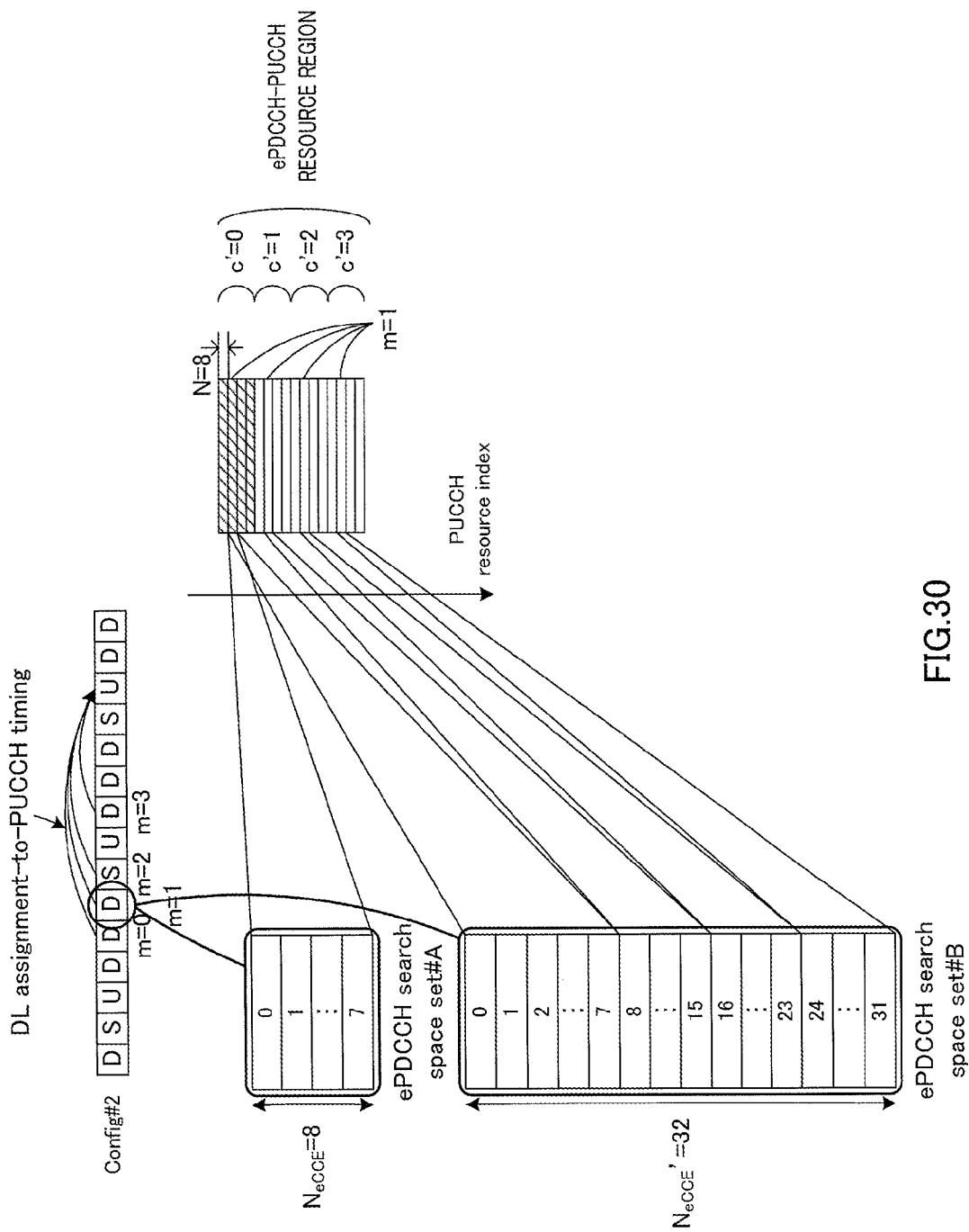
FIG. 30 is a second diagram provided for describing a size of dividing a PUCCH resource region of variation 7 according to Embodiment 2 of the present invention.

Next, FIG. 30 illustrates a specific example of a case where N=32 in FIG. 29 is changed to N=8. When the PUCCH resource region is assigned to only ePDCCH search space set A, the corresponding PUCCH resources (shaded parts in FIG. 30) are arranged tightly close to each other within the PUCCH resource region. Thus, when the PUCCH resource region is shared among a plurality of ePDCCH search space sets, if the PUCCH resource region is assigned to only ePDCCH search space set A, setting N=8 makes it possible to reduce the overhead of PUCCH compared to setting N=32.

As described above, the scale of each ePDCCH search space set is 4, 8, 16, 32 or the like. Furthermore, the value of N is preferably divisible among a plurality of ePDCCH search space sets because PUCCH resources are never dispersed and PUCCH resources can be efficiently used in this way. As such, when the PUCCH resource region is shared among a plurality of ePDCCH search space sets of different scales, the value of N may be set to a smaller ePDCCH search space set. That is, as shown in FIG. 29 and FIG. 30, when the scale of ePDCCH search space set A is $N_{eCCE}=8$ and the scale of ePDCCH search space set B is $N_{eCCE}'=32$, N=8 is set. However, since terminal 200 does not recognize any ePDCCH search space other than ePDCCH search space sets intended for the terminal, it is the premise that the scales of ePDCCH search space set A and ePDCCH search space set B should be indicated to terminal 200.

When the PUCCH resource region is shared among a plurality of ePDCCH search space sets of different scales, overhead of PUCCH can be reduced by setting the value of N to a smaller ePDCCH search space set.

From the above, the method of determining N in terminal 200 according to method 1 is as follows.

When PUCCH resources are shared among a plurality of ePDCCH search space sets set in terminal 200, terminal 200 sets as the value of N, the scale of the smallest ePDCCH search space among the plurality of ePDCCH search space sets set in the terminal among which the PUCCH resources are shared. This can reduce the overhead of PUCCH.

Here, the decision as to whether or not to share PUCCH resources is determined as follows. When it is assumed that the start positions of PUCCH resources relating to ePDCCH search space set A and ePDCCH search space set B set in terminal 200 are $N^{(1)}_{PUCCH}$ and $N^{(1)}_{PUCCH}{}'$ ($N^{(1)}_{PUCCH} \leq N^{(1)}_{PUCCH}{}'$) respectively, and when equation 18 is satisfied regarding scale $N_{eCCE}$ of ePDCCH search space set A, ePDCCH search space set A and ePDCCH search space set B share the PUCCH resources. The PUCCH resources are not shared when equation 18 is not satisfied.

[8]

$$N_{PUCCH}^{(1)} + M \cdot N_{eCCE} > N_{PUCCH}^{(1)}{}'$$ (Equation 18)

When the PUCCH resource region is not shared among a plurality of ePDCCH search space sets set in terminal 200, the scale of ePDCCH search space sets may be set to the value of N for the ePDCCH search space sets. Alternatively, the scale of ePDCCH search space sets may be set to the smallest among the scales of ePDCCH search space sets set in terminal 200 for simplicity.

To put it more simply, even when the scale of ePDCCH search space sets which becomes the smallest among all ePDCCH search space sets set in terminal 200 is set to the value of N, it is likewise possible to reduce the overhead of PUCCH.

(Method 2)

Figure 31:
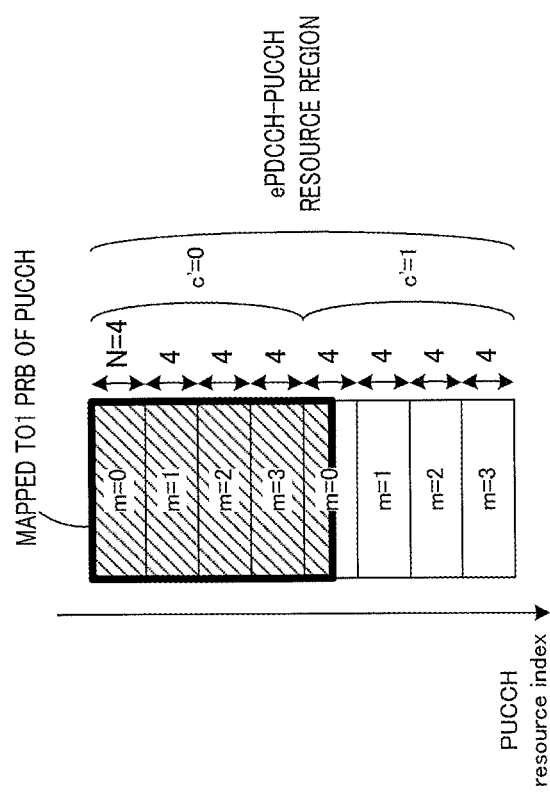
FIG. 31 is a third diagram provided for describing a size of dividing a PUCCH resource region of variation 7 according to Embodiment 2 of the present invention.

FIG. 31 illustrates a PUCCH resource region when N=4. PUCCHs can be multiplexed with one PRB (Physical Resource Block) by a maximum of 36 PUCCHs/$\Delta_{PUCCH\_OFFSET}$ in ascending order of PUCCH resource indices. Here, $\Delta_{PUCCH\_OFFSET}$ represents the amount of offset of PUCCHs mapped within one PRB and is generally $\Delta_{PUCCH\_OFFSET}=2$ or 3. That is, when $\Delta_{PUCCH\_OFFSET}=2, 3$, a maximum 18 and 12 PUCCHs can be multiplexed with one PRB. However, in reality, interference between PUCCHs within the PRB increases as the multiplexing number increases, and therefore the number of PUCCHs that can be multiplexed with one PRB is smaller than the maximum multiplexing number. As shown in the shaded part in FIG. 31, PUCCHs corresponding to m=0, 1, 2, 3 (4 m's) are multiplexed with one PRB when N=4 (note that $\Delta_{PUCCH\_OFFSET}=2$ in FIG. 31). As the value of m increases, the number of PUCCHs arranged in the PRB increases and interference increases correspondingly. Thus, the greater the value of m, the fewer PUCCHs can be arranged in the PRB. This imposes constraints on scheduling for future subframes.

When the PUCCH resource region is shared among a plurality of ePDCCH search space sets in different scales, setting the value of N to the larger of the ePDCCH search space sets makes it possible to reduce constraints on scheduling for future subframes due to the multiplexing of PUCCHs with many DL subframes within one PRB.

From the above, the method of determining N in terminal 200 according to method 2 is as follows.

When PUCCH resources are shared among a plurality of ePDCCH search space sets set in terminal 200, terminal 200 sets as the value of N, the scale of the largest ePDCCH search space among the plurality of ePDCCH search space sets set in the terminal among which the PUCCH resources are shared. This can reduce constraints on scheduling for future subframes due to the multiplexing of PUCCHs with many DL subframes within one PRB.

Here, the decision as to whether or not to share PUCCH resources is determined according to equation 18 as in the case of method 1.

When method 2 is applied, since the scale of the largest ePDCCH search space among a plurality of ePDCCH search space sets set in the terminal is assumed to be the value of N, the value of c' is always 0. That is, parameter c' need not be taken into account in this case.

Note that when PUCCH resources are not shared among a plurality of ePDCCH search space sets set in terminal 200, the scales of the ePDCCH search space sets may be set to the value of N for the respective ePDCCH search space sets. Alternatively, the scales of ePDCCH search space sets may be set to the largest among the scales of ePDCCH search space sets set in terminal 200 for simplicity.

To put it more simply, even when the scale of an ePDCCH search space set which becomes the largest among all ePDCCH search space sets set in terminal 200 is set to the value of N, it is likewise possible to reduce constraints on scheduling for future subframes due to the multiplexing of PUCCHs with many DL subframes within one PRB.

(Method 3)

Method 1 and method 2 are in a trade-off relationship and the degree of importance to be attached to effects obtained from method 1 and method 2 varies depending on how the system that applies the present variation is operated. In a system that attaches importance to downlink communication, a UL-DL configuration having a high DL subframe ratio such as UL-DL Configuration 2 is used. In this case, method 1 that can reduce the overhead of PUCCH is effective since it is necessary to indicate HARQ-ACK for downlink data in a plurality of DL subframes collectively in one UL subframe. Method 2 is effective when attaching importance to a simpler base station configuration by reducing the complexity of the base station scheduler. To make the most of the effects of both method 1 and method 2, the method of determining N in terminal 200 according to method 3 may be configured as follows.

After setting a static or quasi-static lower limit value to a possible value of N, when PUCCH resources are shared among a plurality of ePDCCH search space sets set in the terminal, terminal 200 designates the scale of the smallest ePDCCH search space among a plurality of ePDCCH search space sets set in the terminal sharing the PUCCH resources as the value of N. However, when this value falls below a lower limit value, the value of N is set to the lower limit value. It is thereby possible to reduce the overhead of PUCCH while reducing constraints on scheduling for future subframes due to the multiplexing of PUCCH with many DL subframes within one PRB.

(Method 4)

According to method 4 in contrast to method 3, when sharing PUCCH resources among a plurality of ePDCCH search space sets after setting an upper limit value, terminal 200 designates the scale of the largest ePDCCH search space among a plurality of ePDCCH search space sets set in the terminal sharing PUCCH resources as the value of N. That is, the method of determining N in terminal 200 according to method 4 is as follows.

After setting a static or quasi-static upper limit value to a possible value of N, when PUCCH resources are shared among a plurality of ePDCCH search space sets set in the terminal, terminal 200 designates the scale of the largest ePDCCH search space among a plurality of ePDCCH search space sets set in the terminal sharing the PUCCH resources as the value of N. However, when this value exceeds an upper limit value, the value of N is set to the upper limit value. It is thereby possible to reduce constraints on scheduling for future subframes due to the multiplexing of PUCCH with many DL subframes within one PRB while reducing the overhead of PUCCH.

(Method 5)

According to method 5 in association with method 2, the value of N is set to a maximum value of PUCCH that can be multiplexed with one PRB. That is, terminal 200 sets the value of N based on equation 19. Here, $\Delta_{PUCCH\_OFFSET}$ represents the amount of offset of PUCCH to be mapped within one PRB and is a value set in advance by base station 100. Since HARQ-ACKs arranged on PUCCHs in one PRB correspond to only downlink data in one DL subframe, it is possible to avoid constraints on scheduling for future subframes due to the multiplexing of PUCCHs with many DL subframes within one PRB.

[19]

$$N=36/\Delta_{PUCCH\_OFFSET} \quad \text{(Equation 19)}$$

(Method 6)

As described in method 1, the scale of ePDCCH search space sets is 4, 8, 16, 32 or the like, and since PUCCH resources are never dispersed if the value of N is divisible among a plurality of ePDCCH search space sets, PUCCH resources can be efficiently used. Thus, in method 6, the value of N is equalized to the scale of the ePDCCH search space set. The present method can be combined with one of methods 1 to 5.

A specific method of setting the value of scale N of a PUCCH resource region for each c' and each m has been described so far for the case where the PUCCH resource region is shared among a plurality of ePDCCH search space sets.

Embodiment 3

In Embodiment 2, terminal 200 calculates c' based on not only eCCE index $n_{eCCE}$ but also offset value $\delta_{ARI}$ in a virtual PUCCH resource region corresponding to $m=m_{current}$ and then identifies PUCCH resources in the actual PUCCH resource region. In the present embodiment, terminal 200 includes the ePDCCH-PUCCH resource region corresponding to not only $m=m_{current}$ but also $m<m_{current}$ in the virtual PUCCH resource region.

As described above, parameter m is an index of a downlink communication subframe for one uplink communication subframe and sequentially numbered. Thus, parameter m corresponding to $m<m_{current}$ means a past DL subframe. Since DL scheduling in a past DL subframe is determined in the current DL subframe, if there are any free PUCCH resources corresponding to PDCCH or ePDCCH in the past DL subframe, using the free PUCCH resources in the current DL subframe will impose no constraint on scheduling of future DL subframes.

Figure 20:
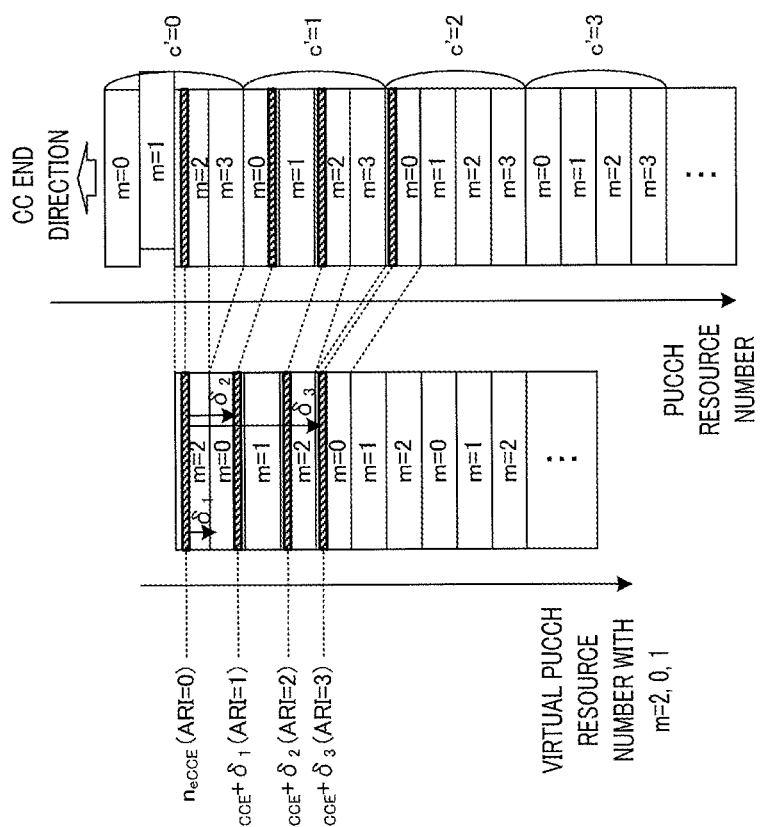
FIG. 20 is a method of determining ePDCCH-PUCCH resources according to Embodiment 3 of the present invention.

In the present embodiment, an ePDCCH-PUCCH resource region when $m \leq m_{current}$ as shown in FIG. 20 is designated as a virtual PUCCH resource region.

FIG. 20 shows an example when $m_{current}=2$.

Here, if $m \leq m_{current}$, since the ePDCCH-PUCCH resource region corresponding to m=0 is most congested, the range of m may be limited such as "$m_{current}$ and $m_{current}-1(m_{current0})$" instead of "$m \leq m_{current}$."

According to the present embodiment, more ePDCCH-PUCCH resources are included in the virtual PUCCH resource region than in Embodiment 1, and it is thereby possible to lower the possibility that the shifted PUCCH resources will be arranged outside the ePDCCH-PUCCH resource region due to a shift based on an offset value indicated by ARI, and reduce the total PUCCH resource region.

Variations 1 to 7 shown in Embodiment 2 are also applicable in the present embodiment.

Embodiment 4

In Embodiment 2, terminal 200 calculates c' based on not only eCCE index $n_{eCCE}$ but also offset value $\delta_{ARI}$ in the virtual PUCCH resource region corresponding to $m=m_{current}$ and then identifies PUCCH resources in the actual PUCCH resource region. In the present embodiment, terminal 200 includes an ePDCCH-PUCCH resource region corresponding to not only $m=m_{current}$ but also $m=m_{special}$ when the occupancy of the PUCCH region is low, in the virtual PUCCH resource region.

Figure 3:
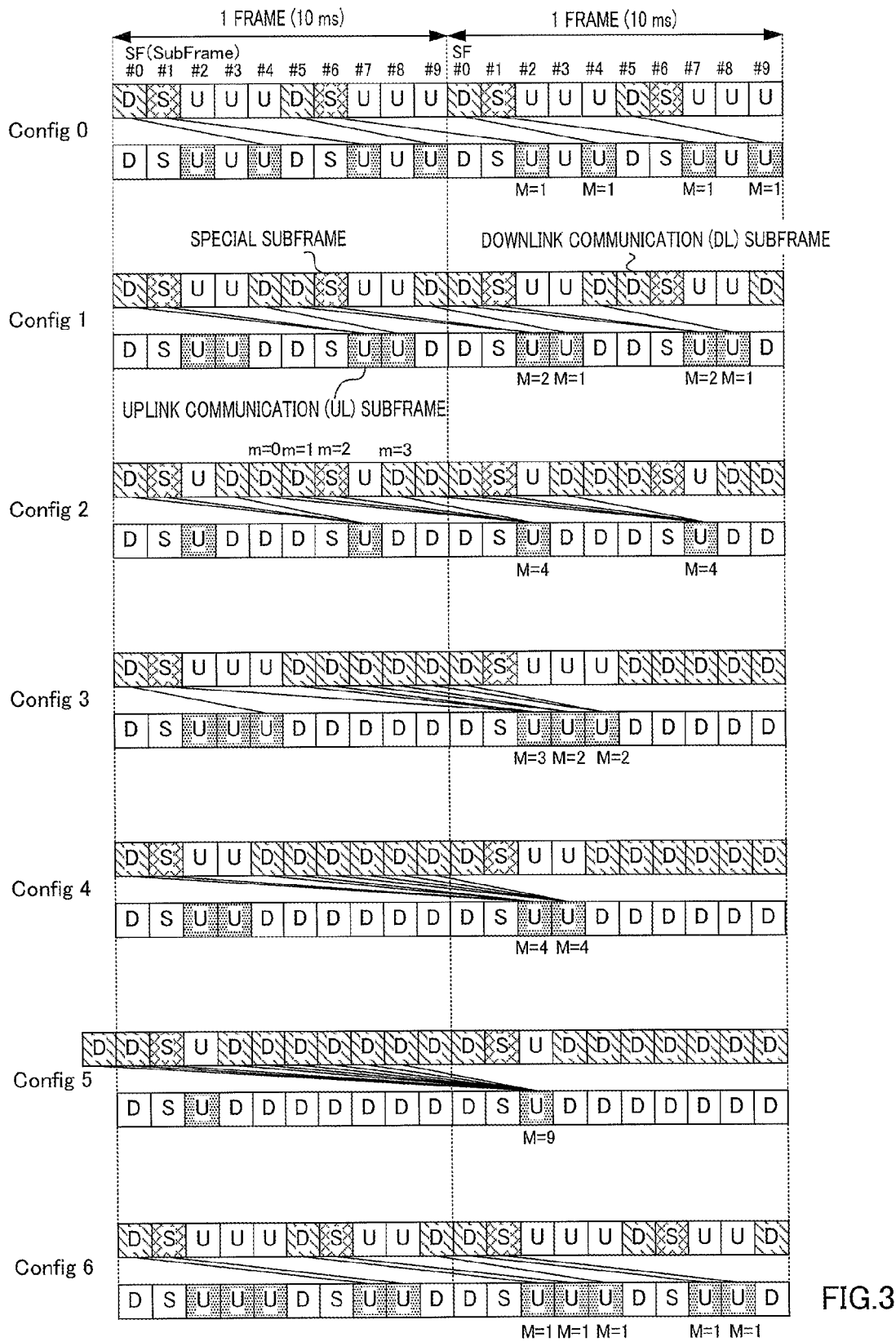
FIG. 3 is a diagram provided for describing a UL-DL configuration in TDD.
Figure 4:
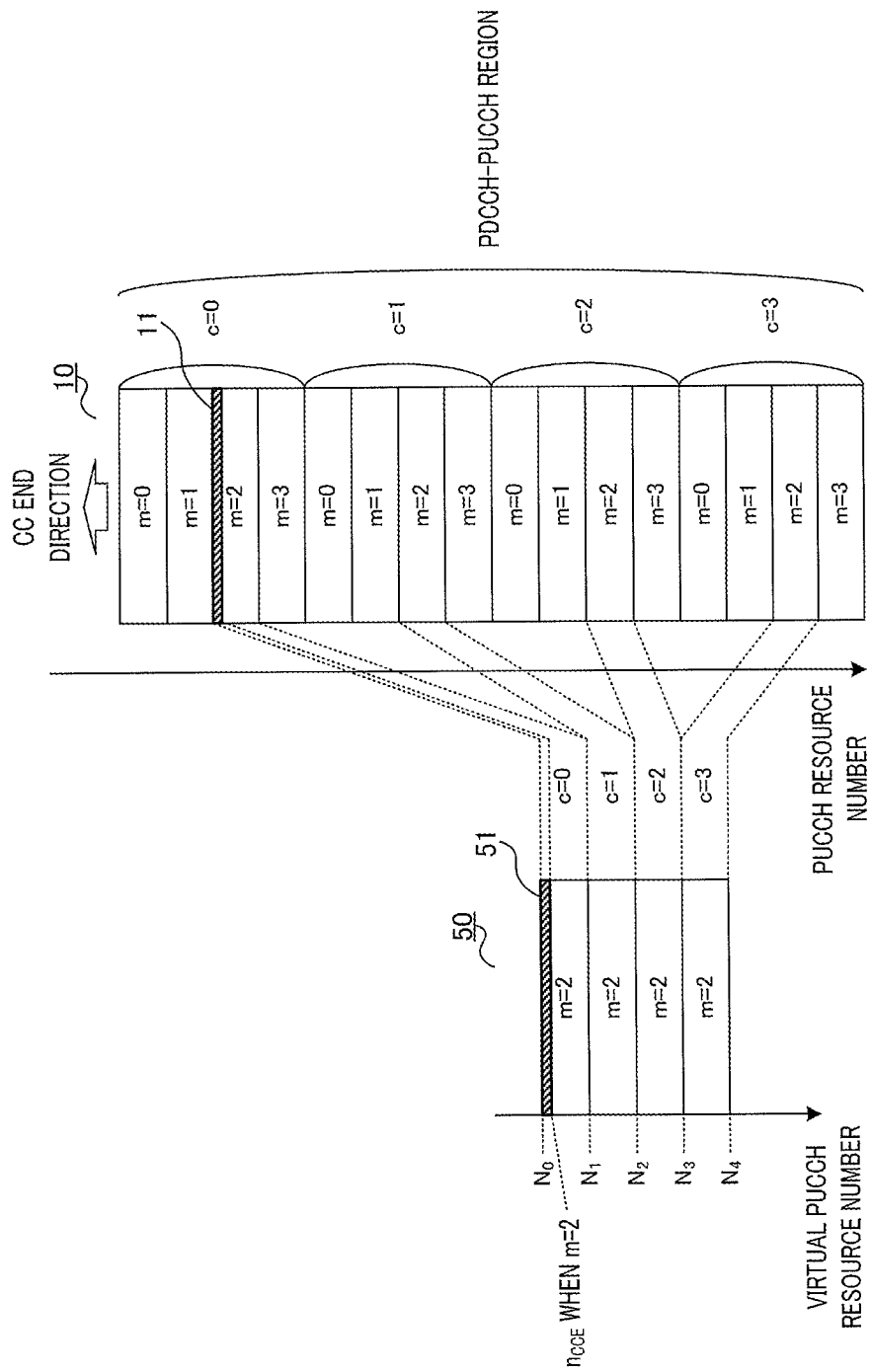
FIG. 4 is a diagram provided for describing a PDCCH-PUCCH resource region.
Figure 5:
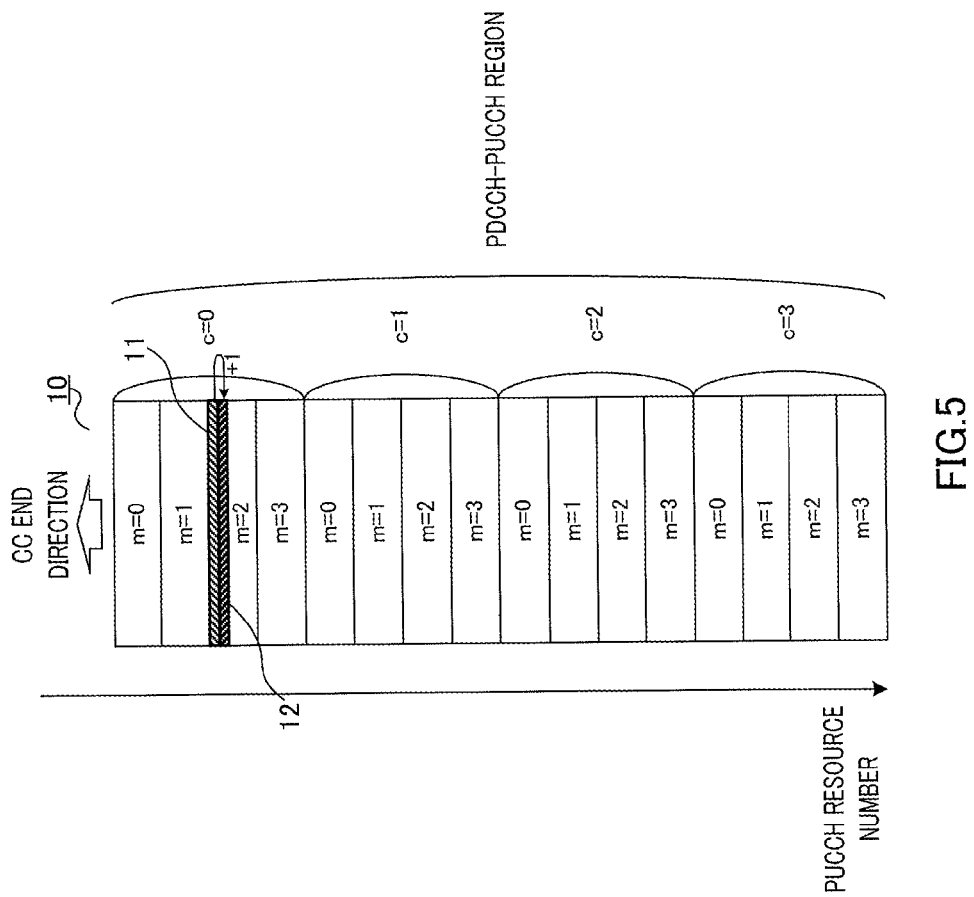
FIG. 5 is a diagram provided for describing an offset value in the PDCCH-PUCCH resource region.
Figure 6:
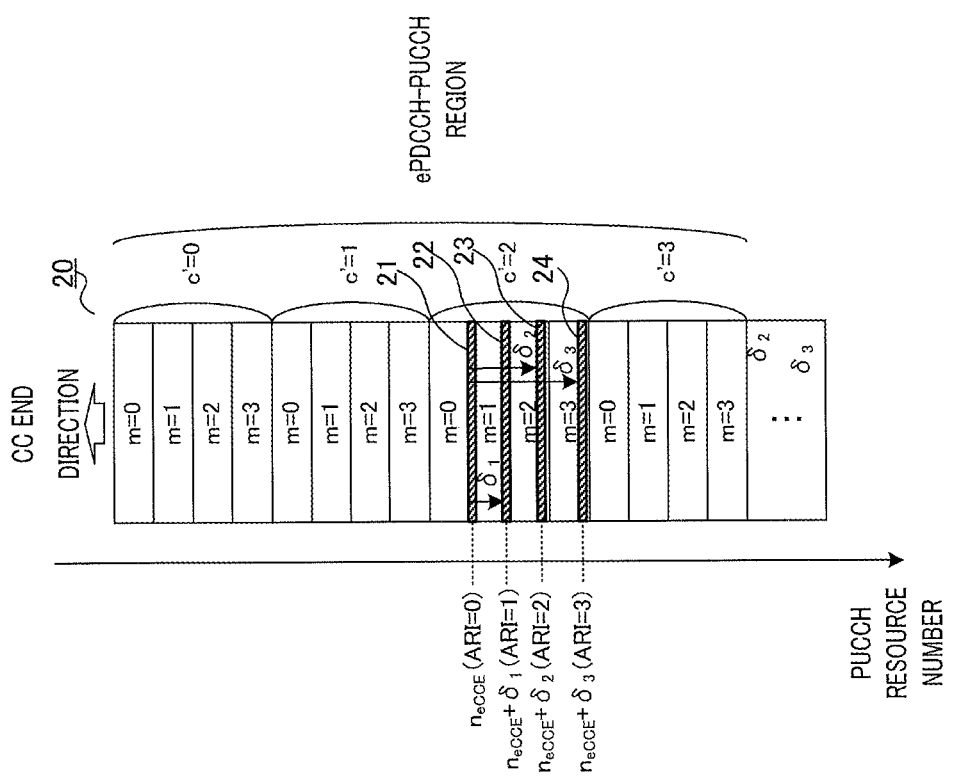
FIG. 6 is a diagram provided for describing problems in the method of determining ePDCCH-PUCCH resources.

As shown in FIG. 3, there are special subframes indicating switchover from a DL subframe to UL subframe in TDD. A special subframe is composed of several symbols for downlink communication (DwPTS: Downlink Pilot Time Slot), a gap and several symbols for uplink communication (UpPTS: Uplink Pilot Time Slot). In DwPTS, downlink data communication may be performed as in the case of a downlink communication subframe. In UpPTS, SRS (Sounding Reference Signal) transmission or PRACH (Physical Random Access CHannel) transmission may be performed. In a special subframe, available PDCCH region and PDSCH region are smaller than those in other DL subframes. Thus, there are fewer terminals to which PDSCHs are assigned in the subframe.

When a HetNet environment combining a macro cell and a pico cell is assumed, ABS (Almost Blank Subframe) is defined in which PDCCH and PDSCH are not assigned in downlink subframes in the macro cell in order to avoid interference from the macro cell to the pico cell. There are no PDCCH-PUCCH resources in the subframe.

Thus, in a special subframe or ABS, the occupancy of PUCCH by PDCCH is locally lowered. Therefore, in the present embodiment, ePDCCH-PUCCH resources are positively arranged in the PUCCH region whose occupancy is locally low. This allows free resources to be effectively used.

Figure 21:
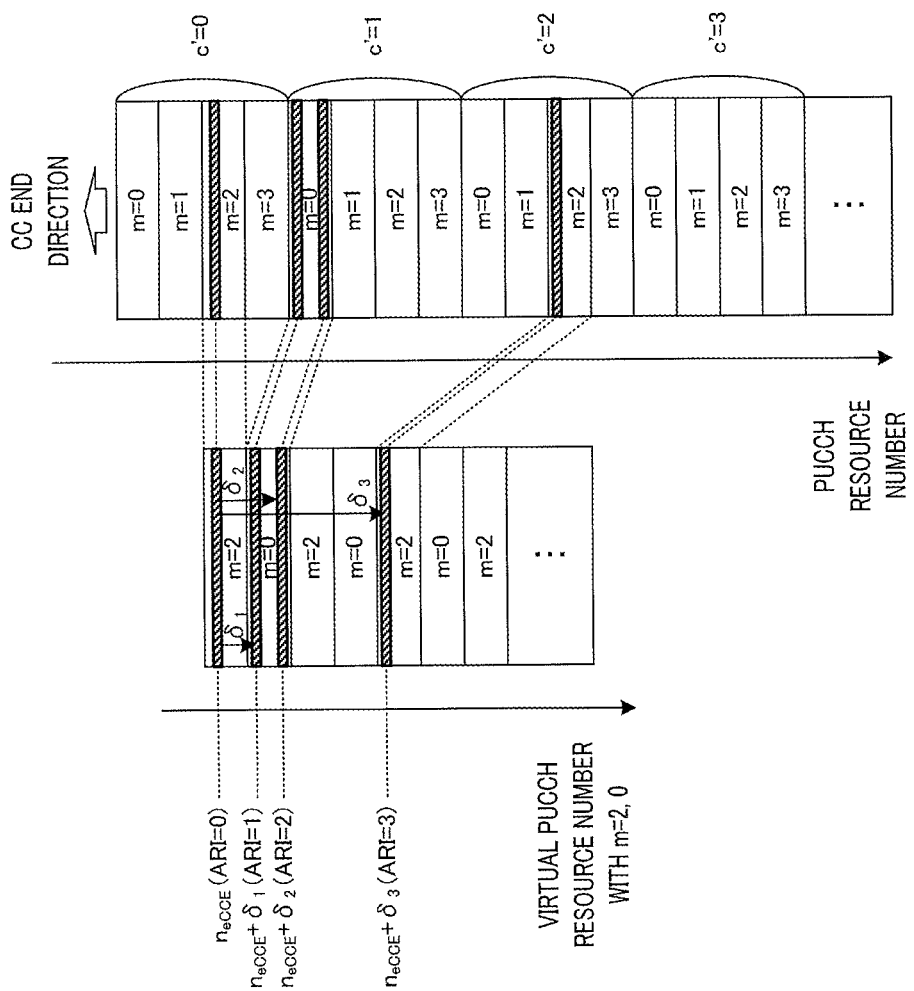
FIG. 21 is a method of determining ePDCCH-PUCCH resources according to Embodiment 4 of the present invention.

FIG. 21 illustrates a case where $m_{current}=2$ and special subframe $m_{special}=0$. Here, m=0, 1 and 2 in FIG. 21 correspond to SF#1, 5 and 6 in UL-DL Configuration#3 in FIG. 3.

In this case, an ePDCCH-PUCCH resource region corresponding to $m=m_{current}=2$ or $m_{special}=0$ is defined as a virtual PUCCH resource region.

Variations 1 to 7 shown in Embodiment 2 are also applicable in the present embodiment.

Embodiment 4 may be operated in combination with Embodiment 3. That is, the ePDCCH-PUCCH resource region corresponding to $m \leq m_{current}$ and $m=m_{special}$ can also be defined as a virtual PUCCH resource region.

The embodiments of the present invention have been described so far.

The above description has focused on the avoidance of collision between PDCCH-PUCCH and ePDCCH-PUCCH, but the present invention is also applicable for the avoidance of collision between ePDCCH-PUCCH in an ePDCCH terminal and PUCCH in a UL CoMP terminal in addition to the avoidance of collision described above.

Figure 22:
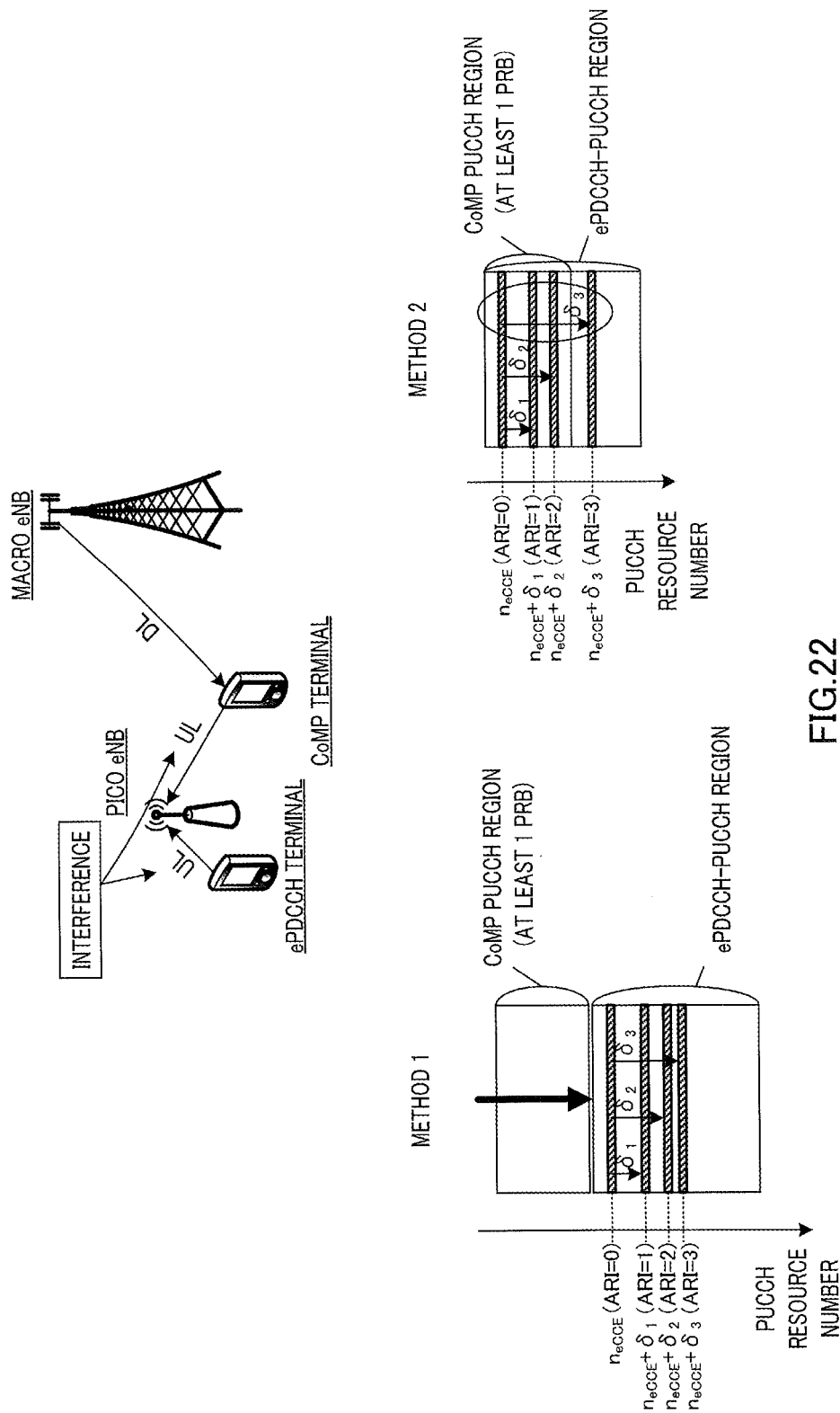
FIG. 22 is a diagram provided for describing problems and a solution thereof when an ePDCCH terminal and a UL CoMP terminal exist.

FIG. 22 illustrates a case where when an ePDCCH terminal and a UL CoMP terminal exist in a HetNet environment, the UL CoMP terminal receives PDCCH (ePDCCH) and PDSCH from macro eNB and transmits PUCCH to pico eNB. When the ePDCCH terminal and UL CoMP terminal transmit PUCCHs using the same PRB, even when PUCCH resources orthogonal to each other within the same PRB are used for PUCCHs, interference due to a difference in reception timing of a plurality of PUCCHs in pico eNB or interference due to a difference in PUCCH receiving power (far-near problem) occurs. This is attributable to the fact that while the UL CoMP terminal performs downlink communication with macro eNB, the UL CoMP terminal performs uplink communication with pico eNB.

In order to avoid such interference, PUCCH resources need to be shifted by at least one PRB. FIG. 22 illustrates method 1 and method 2 as such a method.

In method 1, the entire ePDCCH-PUCCH resource region is offset and resources completely different from a PUCCH resource region for CoMP are used to thereby avoid interference. Method 1 can easily avoid interference, but meanwhile, there is a problem that the overhead of PUCCH resources in total is large.

Thus, method 2 shares the ePDCCH-PUCCH resource region and the CoMP PUCCH resource region to reduce the overhead of PUCCH resources in total. In this case, in order to avoid interference, a shift is made based on an offset value indicated by ART. Here, in order to realize at least one PRB shift, when the number of PUCCH resources per PRB is 18, the offset value needs to be set to 18 or above. For this reason, the possibility that the offset destination PUCCH resource may become $m>m_{current}$ is higher than in the case with "+1" which is an offset value applied in the PDCCH-PUCCH resource region. That is, there are problems similar to the problems to be solved in the present invention. That is, constraints are generated on scheduling of future DL subframes and collision between PUCCH resources occurs (however, in the case of FIG. 22, collision between ePDCCH-PUCCH resources and CoMP PUCCH resources instead of collision between ePDCCH-PUCCH resources and PDCCH-PUCCH resources).

The present invention is applicable not only to a case where collision occurs between ePDCCH-PUCCH resources and PDCCH-PUCCH resources or between ePDCCH-PUCCH resources and UL CoMP PUCCH resources, but also to a case where collision occurs between ePDCCH-PUCCH resources between different ePDCCH terminals. That is, the present invention is applicable to a case where collision occurs between PUCCH resources between different terminals and where ePDCCH-PUCCH resources are used in at least one terminal.

Although an antenna has been described in the aforementioned embodiments, the present invention may be similarly applied to an antenna port.

The term "antenna port" refers to a logical antenna including one or more physical antennas. In other words, the term "antenna port" does not necessarily refer to a single physical antenna, and may sometimes refer to an antenna array including a plurality of antennas, and/or the like.

For example, how many physical antennas are included in the antenna port is not defined in LTE, but the antenna port is defined as the minimum unit allowing the base station to transmit different reference signals in LTE.

In addition, an antenna port may be specified as a minimum unit to be multiplied by a precoding vector weighting.

In the foregoing embodiments, the present invention is configured with hardware by way of example, but the invention may also be provided by software in cooperation with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

As described above, a terminal apparatus according to the embodiments described above is a terminal apparatus including: a control section that arranges a response signal on a predetermined PUCCH resource in an uplink control channel (PUCCH) resource region corresponding to an enhanced downlink control channel (ePDCCH); and a transmitting section that transmits the response signal arranged on the PUCCH resource, in which the PUCCH resource region is divided into a plurality of partial regions, and each of the partial regions is divided into a number of downlink communication subframes, PUCCH resources for each index c' of the partial region and each index m indicating a time-sequential order of the downlink communication subframe are arranged in the PUCCH resource region in ascending order of indices m and in ascending order of indices c', and the control section arranges a response signal corresponding to an m-th downlink communication subframe in a PUCCH resource selected from among the PUCCH resources corresponding to the indices m and below.

The terminal apparatus according to the embodiments described above, further includes: an error detection section that detects an error of downlink data in each downlink communication subframe transmitted from a base station apparatus; and a generating section that generates a response signal indicating the error detection result for each downlink communication subframe, in which the control section arranges a response signal indicating the error detection result in an m-th downlink communication subframe in a PUCCH resource selected from among the PUCCH resources corresponding to the indices m and below.

In the terminal apparatus according to the embodiments described above, the control section arranges a response signal corresponding to the m-th downlink communication subframe in a PUCCH resource selected from among the PUCCH resources corresponding to the index m or PUCCH resources corresponding to indices of downlink communication subframes to which fewer ePDCCHs are assigned than to other downlink communication subframes.

In the terminal apparatus according to the embodiments described above, the control section calculates the index c' in a virtual PUCCH resource region in which PUCCH resources corresponding to downlink communication subframes are collected and determines a PUCCH resource on which the response signal is arranged.

In the terminal apparatus according to the embodiments described above, the control section calculates the index c' based on a leading eCCE index occupied by the ePDCCH intended for the terminal and an offset value indicated from base station apparatus and determines a PUCCH resource on which the response signal is arranged.

In the terminal apparatus according to the embodiments described above, when the PUCCH resource determined based on the eCCE index and the offset value is not included in the PUCCH resource region, the control section includes a PUCCH resource on which the response signal is arranged in the PUCCH resource region by circulating the PUCCH resource in the virtual PUCCH resource region or inverting the PUCCH resource at an end of the virtual PUCCH resource region.

In the terminal apparatus according to the embodiments described above, when the PUCCH resource determined based on the eCCE index and the offset value is not included in the PUCCH resource region, the control section determines a PUCCH resource on which the response signal is arranged in a region other than the virtual PUCCH resource region.

In the terminal apparatus according to the embodiments described above, when the index c' is smaller than a predetermined threshold, the control section determines a PUCCH resource on which the response signal is arranged based on a positive offset value in a direction in which the index m and the index c' increase, and when the index c' is greater than the threshold, the control section determines a PUCCH resource on which the response signal is arranged based on a negative offset value in a direction in which the index m and the index c' decrease.

In the terminal apparatus according to the embodiments described above, the control section calculates the index c' based on a fixed value indicated from the base station apparatus and determines a PUCCH resource on which the response signal is arranged.

In addition, a base station apparatus according to the embodiments described above is a base station apparatus including: a control section that determines whether or not a predetermined PUCCH resource in an uplink control channel (PUCCH) resource region corresponding to an enhanced downlink control channel (ePDCCH) collides with another resource; a control information generating section that generates control information for identifying a non-colliding PUCCH resource for a terminal apparatus; and a transmitting section that transmits the control information, in which: the PUCCH resource region is divided into a plurality of partial regions, and each of the partial regions is divided into a number of downlink communication subframes, PUCCH resources for each index c' of the partial region and each index m indicating a time-sequential order of the downlink communication subframe are arranged in the PUCCH resource region in ascending order of in and in ascending order of c', and the control section determines collision or no collision with another resource among PUCCH resources corresponding to the indices m and below.

A transmission method according to the embodiments described above is transmission method including: making a control to arrange a response signal on a predetermined PUCCH resource in an uplink control channel (PUCCH) resource region corresponding to an enhanced downlink control channel (ePDCCH); and transmitting the response signal arranged on the PUCCH resource, in which: the PUCCH resource region is divided into a plurality of partial regions, and each of the partial regions is divided into a number of downlink communication subframes, PUCCH resources for each index c' of the partial region and each index m indicating a time-sequential order of the downlink communication subframe are arranged in the PUCCH resource region in ascending order of m and in ascending order of c', and in the making a control, a response signal corresponding to an m-th downlink communication subframe is arranged in a PUCCH resource selected from among the PUCCH resources corresponding to the indices m and below.

The disclosures of the specifications, drawings, and abstracts in Japanese Patent Application No. 2012-172348 filed on Aug. 2, 2012, and Japanese Patent Application No. 2012-209810 filed on Sep. 24, 2012, are incorporated herein by reference in their entireties.

INDUSTRIAL APPLICABILITY

The present invention is suitable for use in mobile communication systems compliant with LTE-Advanced.

REFERENCE SIGNS LIST

100 Base station
200 Terminal
101, 208 Control section
102 Control information generating section
103, 105 Coding section
104, 107 Modulation section
106 Data transmission controlling section
108 Mapping section
109, 218 IFFT section
110, 219 CP adding section
111, 222 Radio transmitting section
112, 201 Radio receiving section
113, 202 CP removing section
114 PUCCH extracting section
115 Despreading section
116 Sequence controlling section
117 Correlation processing section
118 A/N determining section
119 Bundled A/N despreading section
120 IDFT section
121 Bundled A/N determining section
122 Retransmission control signal generating section
203 FFT section
204 Extraction section
205, 209 Demodulation section
206, 210 Decoding section
207 Determination section
211 CRC section
212 Response signal generating section
213 Coding and modulation section
214 Primary-spreading section
215 Secondary-spreading section
216 DFT section
217 Spreading section
220 Time multiplexing section
221 Selection section

The invention claimed is:

1. A terminal apparatus comprising:
a controller, which, in operation,
determines a physical uplink control channel (PUCCH) resource based on a leading enhanced control channel element (eCCE) index ($n_{eCCE}$) of an enhanced physical downlink control channel (ePDCCH) received by the terminal apparatus and a first offset value indicated by an acknowledgement/negative-acknowledgement (Ack/Nack) Resource Indicator (ARI) out of a plurality of first offset values, wherein the first offset value is a negative value and calculated using a formula that includes as a parameter a size of an ePDCCH search space set configured for the terminal apparatus, wherein the size of the ePDCCH search space set for a special subframe is smaller than the size of the ePDCCH search space set for a non-special subframe such that an absolute value of the first offset value calculated for a special subframe is smaller than an absolute value of the first offset value calculated for a non-special subframe, and
arranges a response signal on the determined PUCCH resource; and
a transmitter, which, in operation, transmits the response signal on the determined PUCCH resource.

2. The terminal apparatus according to claim 1, wherein, the controller determines the PUCCH resource based on addition of the first offset value to the $n_{eCCE}$.

3. The terminal apparatus according to claim 1, wherein, the controller determines the PUCCH resource based additionally on a second offset value, wherein the second offset value specifies a starting point of a PUCCH resource region and is capable of taking different values for different ePDCCH search space sets.

4. The terminal apparatus according to claim 3, wherein, the second offset value takes a different value in each one of at least two ePDCCH search space sets.

5. The terminal apparatus according to claim 1, wherein, the size of the ePDCCH search space set for a special subframe is half the size of the ePDCCH search space set for a non-special subframe.

6. A method performed by a terminal apparatus, the method comprising:
determining a physical uplink control channel (PUCCH) resource based on a leading enhanced control channel element (eCCE) index ($n_{eCCE}$) of an enhanced physical downlink control channel (ePDCCH) received by the terminal apparatus and a first offset value indicated by an acknowledgement/negative-acknowledgement (Ack/Nack) Resource Indicator (ARI) out of a plurality of offset values, wherein the first offset value is a negative value and calculated using a formula that includes as a parameter a size of an ePDCCH search space set configured for the terminal apparatus, wherein the size of the ePDCCH search space set for a special subframe is smaller than the size of the ePDCCH search space set for a non-special subframe such that an absolute value of the first offset value calculated for a special subframe is smaller than an absolute value of the first offset value calculated for a non-special subframe;
arranging a response signal on the determined PUCCH resource; and transmitting the response signal on the determined PUCCH resource.

7. The method according to claim 6, wherein, the determining step includes determining the PUCCH resource based on addition of the first offset value to the $n_{eCCE}$.

8. The method according to claim 6, wherein, the determining step includes determining the PUCCH resource based additionally on a second offset value, wherein the second offset value indicates a starting point of a PUCCH resource region and is capable of taking different values for different ePDCCH search space sets.

9. The method according to claim 8, wherein, the second offset value takes a different value in each one of at least two ePDCCH search space sets.

10. The method according to claim 6, wherein, the size of the ePDCCH search space set for a special subframe is half the size of the ePDCCH search space set for a non-special subframe.

11. An integrated circuit for controlling operation of a terminal apparatus, the integrated circuitry comprising:
control circuitry, which, in operation,
determines a physical uplink control channel (PUCCH) resource based on a leading enhanced control channel element (eCCE) index ($n_{eCCE}$) of an enhanced physical downlink control channel (ePDCCH) received by the terminal apparatus and a first offset value indicated by an acknowledgement/negative-acknowledgement (Ack/Nack) Resource Indicator (ARI) out of a plurality of first offset values, wherein the first offset value is a negative value and calculated using a formula that includes as a parameter a size of an ePDCCH search space set configured for the terminal apparatus, wherein the size of the ePDCCH search space set for a special subframe is smaller than the size of the ePDCCH search space set for a non-special subframe such that an absolute value of the first offset value calculated for a special subframe is smaller than an absolute value of the first offset value calculated for a non-special subframe, and
arranges a response signal on the determined PUCCH resource; and
transmission circuitry, which, in operation, controls transmission of the response signal on the determined PUCCH resource.

12. The integrated circuit according to claim 11, wherein, the control circuitry determines the PUCCH resource based on addition of the first offset value to the $n_{eCCE}$.

13. The integrated circuit according to claim 11, wherein, the control circuitry determines the PUCCH resource based additionally on a second offset value, wherein the second offset value indicates a starting point of a PUCCH resource region and is capable of taking different values for different ePDCCH search space sets.

14. The integrated circuit according to claim 13, wherein, the second offset value takes a different value in each one of at least two ePDCCH search space sets.

15. The integrated circuit according to claim 11, wherein, the size of the ePDCCH search space set for a special subframe is half the size of the ePDCCH search space set for a non-special subframe.

* * * * *